US008576367B2

(12) United States Patent
Yoo et al.

(10) Patent No.: US 8,576,367 B2
(45) Date of Patent: Nov. 5, 2013

(54) LIQUID CRYSTAL DISPLAY PANEL DEVICE WITH A TRANSPARENT CONDUCTIVE FILM FORMED PIXEL ELECTRODE AND GATE PAD AND DATA PAD ON SUBSTRATE AND METHOD OF FABRICATING THE SAME

(75) Inventors: Soon Sung Yoo, Kyounggi-do (KR); Youn Gyoung Chang, Kyounggi-do (KR); Seung Hee Nam, Kyounggi-do (KR)

(73) Assignee: LG Display Co., Ltd., Seoul (KR)

( * ) Notice: Subject to any disclaimer, the term of this patent is extended or adjusted under 35 U.S.C. 154(b) by 604 days.

(21) Appl. No.: 10/962,448

(22) Filed: Oct. 13, 2004

(65) Prior Publication Data

US 2005/0078246 A1   Apr. 14, 2005

(30) Foreign Application Priority Data

Oct. 14, 2003  (KR) .............. 10-2003-71377

(51) Int. Cl.
  *G02F 1/1345*  (2006.01)
  *G02F 1/1343*  (2006.01)
  *G02F 1/136*   (2006.01)
  *G09G 3/36*    (2006.01)
  *H01L 29/04*   (2006.01)

(52) U.S. Cl.
  USPC .......... 349/152; 349/42; 349/43; 349/143; 345/92; 345/103; 345/104; 257/59; 257/72

(58) Field of Classification Search
  USPC ........... 349/42–43, 106, 141–143, 149, 152; 345/88, 92, 104; 257/59, 72
  See application file for complete search history.

(56) References Cited

U.S. PATENT DOCUMENTS

| 5,469,020 | A  | * | 11/1995 | Herrick ............... 313/511 |
| 5,835,177 | A  | * | 11/1998 | Dohjo et al. ............ 349/147 |
| 6,177,970 | B1 | * | 1/2001  | Kim ..................... 349/43 |
| 6,509,614 | B1 | * | 1/2003  | Shih .................... 257/350 |
| 6,531,392 | B2 | * | 3/2003  | Song et al. ............. 438/648 |
| 6,642,972 | B2 | * | 11/2003 | Yoo et al. ............... 349/40 |
| 6,671,010 | B2 | * | 12/2003 | Kwon et al. ............. 349/43 |

(Continued)

FOREIGN PATENT DOCUMENTS

| JP | 2000-002886 | 7/2000 |
| JP | 2001-154221 | 8/2001 |

(Continued)

*Primary Examiner* — Hoan C Nguyen
(74) *Attorney, Agent, or Firm* — Morgan, Lewis & Bockius LLP

(57) ABSTRACT

A liquid crystal display panel device includes a thin film transistor array substrate having a gate line provided on a substrate, a data line intersecting the gate line and having a gate insulating pattern disposed therebetween to define a pixel area, a thin film transistor provided at the intersection between the gate line and the data line, a protective film for protecting the thin film transistor, a pixel electrode provided at the pixel area and connected to the thin film transistor, a gate pad connected to the gate line and formed from a transparent conductive film included in the gate line, and a data pad connected to the data line and formed from the transparent conductive film, and a color filter array substrate joined with the thin film transistor array substrate to be opposed to each other, wherein the protective film is provided at an area where it overlaps with the color filter array substrate to expose the transparent conductive films included in the gate pad and the data pad.

7 Claims, 38 Drawing Sheets

(56) References Cited

U.S. PATENT DOCUMENTS

| | | | |
|---|---|---|---|
| 6,788,355 B1 * | 9/2004 | Ihida et al. | 349/43 |
| 6,956,634 B2 * | 10/2005 | Kim et al. | 349/141 |
| RE38,901 E * | 11/2005 | Park et al. | 438/30 |
| 2002/0160555 A1 * | 10/2002 | Hong et al. | 438/158 |
| 2003/0197187 A1 * | 10/2003 | Kim et al. | 257/83 |
| 2004/0036073 A1 * | 2/2004 | Hong et al. | 257/72 |

FOREIGN PATENT DOCUMENTS

| | | |
|---|---|---|
| KR | 1995-0029820 | 11/1995 |
| KR | 1998-072232 | 11/1998 |
| KR | 2001009268 A * | 2/2001 |

* cited by examiner

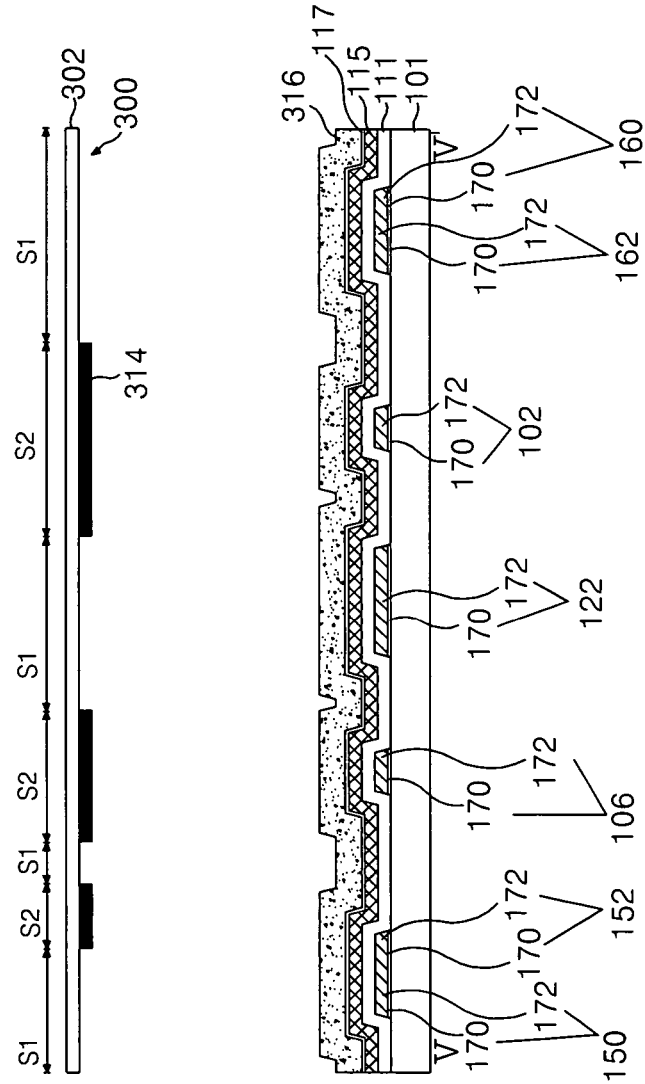

LIQUID CRYSTAL DISPLAY PANEL DEVICE WITH A TRANSPARENT CONDUCTIVE FILM FORMED PIXEL ELECTRODE AND GATE PAD AND DATA PAD ON SUBSTRATE AND METHOD OF FABRICATING THE SAME

The present invention claims the benefit of Korean Patent Application No. P2003-71377, filed in Korea on Oct. 14, 2003, which is hereby incorporated by reference.

BACKGROUND OF THE INVENTION

1. Field of the Invention

The present invention relates to a liquid crystal display (LCD) device and a method of fabricating an LCD device, and more particularly to an LCD panel device and a fabricating method of fabricating an LCD panel device.

2. Description of the Related Art

In general, an LCD device controls transmission of light through liquid crystal material by application of an electric field thereto, thereby displaying an image. The LCD device drives the liquid crystal material by varying the electric field formed between a pixel electrode and a common electrode arranged in opposition to each other on upper and lower substrates.

The LCD device includes a lower array substrate (i.e., thin film transistor (TFT) array substrate) and an upper array substrate (i.e., color filter array substrate) that are coupled together. Accordingly, a spacer is disposed between the upper and lower substrates in order to maintain a uniform cell gap between the upper and lower substrates, wherein a liquid crystal material is filled within the cell gap.

The lower array substrate includes a plurality of signal wirings and TFTs, and an alignment film coated thereon to maintain alignment of the liquid crystal material. The upper array substrate includes a color filter for producing colored light, a black matrix for preventing light leakage, and an alignment film coated thereon to maintain alignment of the liquid crystal material.

Fabrication of the lower array substrate includes relatively complicated fabrication processes, such as various semiconductor processes that require a plurality of mask processes, thereby increasing manufacturing cost of the LCD panel device. Consequently, development of the lower array substrate has been directed toward reducing the total number of individual mask processes. For example, a single mask process may include many various sub-processes, such as thin film deposition, cleaning, photolithography, etching, photoresist stripping, and inspection. Presently, a four-round mask process has been developed that excludes one mask process from the currently-used five-round mask process.

FIG. 1 is a plan view of a lower array substrate of an LCD panel device according to the related art, and FIG. 2 is a cross sectional view along II-II' of FIG. 1 according to the related art. In FIGS. 1 and 2, a lower array substrate of an LCD panel device includes a gate line 2 and a data line 4 provided on a lower substrate 1 in such a manner as to intersect each other having a gate insulating film 12 therebetween, a TFT 30 provided at each of the intersections, a pixel electrode 22 provided at a cell area defined by the intersections, a storage capacitor 40 provided at an overlapping portion between the gate line 2 and a storage electrode 28, a gate pad 50 connected to the gate line 2, and a data pad 60 connected to the data line 4. Accordingly, the gate line 2 transmits gate signals and the data line 4 transmits data signals.

The TFT 30 allows a pixel signal transmitted along the data line 4 to be charged into the pixel electrode 22 and maintained in response to a gate signal transmitted along the gate line 2. The TFT 30 includes a gate electrode 6 connected to the gate line 2, a source electrode 8 connected to the data line 4, and a drain electrode 10 connected to the pixel electrode 22. Furthermore, the TFT 30 includes an active layer 14 overlapping the gate electrode 6 and having a gate insulating film 12 therebetween to define a channel between the source electrode 8 and the drain electrode 10. In addition, the active layer 14 overlaps with the data line 4, a lower data pad electrode 62, and a storage electrode 28. Furthermore, an ohmic contract layer is provided on the active layer 14 for making electrical contact with the data line 4, the source electrode 8, the drain electrode 10, the lower data pad electrode 62, and the storage electrode 22.

The pixel electrode 22 is connected, via a first contact hole 20 passing through a protective film 18, to the drain electrode 10 of the thin film transistor 30, and is provided at a pixel area 5. Accordingly, an electric field is created between the pixel electrode 22 to which a pixel signal is supplied via the TFT 30 and a common electrode (not shown) to which a reference voltage is supplied. Thus, liquid crystal molecules between the lower array substrate and the upper array substrate are rotated by such the electric field due to a dielectric anisotropy of the liquid crystal material. Therefore, light transmittance through the pixel area 5 is differentiated depending upon a degree of rotation of the liquid crystal molecules, thereby implementing a gray level scale.

The storage capacitor 40 includes the gate line 2, a storage electrode 28 overlapping with the gate line 2 having the gate insulating film 12, the active layer 14, and the ohmic contact layer 16 therebetween. Accordingly, the storage electrode 28 is connected, via a second contact hole 42 defined at the protective film 18, to the pixel electrode 22. Thus, the storage capacitor 40 allows a pixel signal charged to the pixel electrode 22 to be maintained until the next subsequent pixel signal is charged to the pixel electrode 22.

The gate pad 50 is connected to a gate driver (not shown) to supply gate signals to the gate line 2, and includes a lower gate pad electrode 52 extending from the gate line 2, and an upper gate pad electrode 54 connected, via a third contact hole 56 passing through the gate insulating film 12 and the protective film 18, to the lower gate pad electrode 52.

The data pad 60 is connected to a data driver (not shown) to supply data signals to the data line 4, and includes a lower data pad electrode 62 extending from the data line 4, and an upper data pad electrode 64 connected, via a fourth contact hole 66 passing through the protective film 18, to an upper data pad electrode 64 connected to the lower data pad electrode 62.

FIGS. 3A to 3D are cross sectional views of a method of fabricating the lower array substrate of FIG. 2 according to the related art. In FIG. 3A, gate metal patterns including the gate line 2, the gate electrode 6, and the lower gate pad electrode 52 are provided on the lower substrate 1 using a first mask process. For example, a gate metal layer is formed on the lower substrate 1 by a deposition technique, such as sputtering. Then, the gate metal layer is patterned by photolithography and the etching process using a first mask to form gate metal patterns including the gate line 2, the gate electrode 6, and the lower gate pad electrode 52. The gate metal layer is made from an aluminum group metal.

In FIG. 3B, the gate insulating film 12 is coated onto the lower substrate 1 provided with the gate metal patterns. Then, semiconductor patterns including the active layer 14 and the ohmic contact layer 16, and data patterns including the data line 4, the source electrode 8, the drain electrode 10, the lower data pad electrode 62, and the storage electrode 28 are formed on the gate insulating film 12 by a second mask process. For example, the gate insulating film 12, an amorphous silicon layer, an n+ amorphous silicon layer, and a data metal layer are sequentially provided on the lower substrate 1 provided with the gate metal patterns by deposition techniques, such as plasma enhanced chemical vapor deposition (PECVD) and sputtering. Accordingly, the gate insulating film 12 is formed from an inorganic insulating material, such as silicon nitride ($SiN_x$) or silicon oxide ($SiO_x$), and the data metal is selected from molybdenum (Mo), titanium (Ti), tantalum (Ta), or a molybdenum alloy.

Then, a photo-resist pattern is formed on the data metal layer by photolithography using a second mask. For example, a diffractive exposure mask having a diffractive exposing part at a channel portion of a TFT is used as a second mask, thereby allowing a photo-resist pattern of the channel portion to have a lower height than other source/drain pattern portion. Subsequently, the data metal layer is patterned by a wet etching process using the photo-resist pattern to provide the data patterns including the data line 4, the source electrode 8, the drain electrode 10, which is integral to the source electrode 8, and the storage electrode 28.

Next, the n+ amorphous silicon layer and the amorphous silicon layer are simultaneously patterned by a dry etching process using the same photo-resist pattern to provide the ohmic contact layer 14 and the active layer 16. The photo-resist pattern having a relatively low height is removed from the channel portion by an ashing process and the data metal layer and the ohmic contact layer 16 of the channel portion are etched by the dry etching process. Thus, the active layer 14 of the channel portion is exposed to disconnect the source electrode 8 from the drain electrode 10. Then, the photo-resist pattern left on the data pattern group is removed by a stripping process.

In FIG. 3C, the protective film 18 including the first, second, third, and fourth contact holes 20, 42, 56, and 66 are formed on the gate insulating film 12 provided with the data patterns. For example, the protective film 18 is entirely formed on the gate insulating film 12 provided with the data patterns by a deposition technique, such as the plasma enhanced chemical vapor deposition (PECVD). Then, the protective film 18 is patterned by photolithography and etching processes using a third mask to define the first, second, third, and fourth contact holes 20, 42, 56, and 66. The first contact hole 20 passes through the protective film 18 to expose the drain electrode 10, whereas the second contact hole 42 passes through the protective film 18 to expose the storage electrode 28. The third contact hole 56 passes through the protective film 18 and the gate insulating film 12 to expose the lower gate pad electrode 52, whereas the fourth contact hole 66 passes through the protective film 18 to expose the lower data pad electrode 62. Accordingly, when a metal having a large dry etching ratio, such as molybdenum (Mo), is used as the data metal, the first, second, and fourth contact holes 20, 42, and 66 pass through the drain electrode 10, the storage electrode 28, and the lower data pad electrode 62, respectively, to expose side surfaces thereof. The protective film 18 is made from an inorganic insulating material identical to the gate insulating film 12, or an organic insulating material, such as an acrylic organic compound having a small dielectric constant, benzocyclobutene (BCB), or (perfluorocyclobutane (PFCB).

In FIG. 3D, transparent conductive patterns including the pixel electrode 22, the upper gate pad electrode 54, and the upper data pad electrode 64 are provided on the protective film 18 by a fourth mask process. For example, a transparent conductive film is coated onto the protective film 18 by a deposition technique, such as sputtering. Then, the transparent conductive film is patterned by photolithography and etching processes using a fourth mask to provide the transparent conductive patterns including the pixel electrode 22, the upper gate pad electrode 54, and the upper data pad electrode 64. The pixel electrode 22 is electrically connected, via the first contact hole 20, to the drain electrode 10 while being electrically connected, via the second contact hole 42, to the storage electrode 28. The upper gate pad electrode 54 is electrically connected, via the third contact hole 56, to the lower gate pad electrode 52, and the upper data pad electrode 64 is electrically connected, via the fourth contact hole 66, to the lower data pad electrode 62. The transparent conductive film is formed from indium-tin-oxide (ITO), tin-oxide (TO), indium-tin-zinc-oxide (ITZO), or indium-zinc-oxide (IZO).

The method of fabricating the lower array substrate according to the related art adopts the four-round mask process, thereby reducing the number of fabricating processes and reducing manufacturing costs proportional to the total number of fabricating processes, as compared to the five-round mask process. However, since the four-round mask process is complicated, cost reduction is limited. Thus, further simplification of the fabricating processes are necessary to further reduce manufacturing costs.

SUMMARY OF THE INVENTION

Accordingly, the present invention is directed to an LCD panel device and method of fabricating an LCD panel device that substantially obviates one or more of the problems due to limitations and disadvantages of the related art.

An object of the present invention is to provide an LCD panel device fabricated using a reduced number of mask processes.

Another object of the present invention is to provide a method of fabricating an LCD panel device having a reduced number of mask processes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display panel device includes a thin film transistor array substrate having a gate line provided on a substrate, a data line intersecting the gate line and having a gate insulating pattern disposed therebetween to define a pixel area, a thin film transistor provided at the intersection between the gate line and the data line, a protective film for protecting the thin film transistor, a pixel electrode provided at the pixel area and connected to the thin film transistor, a gate pad connected to the gate line and formed from a transparent conductive film included in the gate line, and a data pad connected to the data line and formed from the transparent conductive film, and a color filter array substrate joined with the thin film transistor array substrate to be opposed to each other, wherein the protective film is provided at an area where it overlaps with the color filter array substrate to expose the transparent conductive films included in the gate pad and the data pad.

In another aspect, a liquid crystal display panel device includes a gate line provided on a substrate, a data line intersecting the gate line insulated from the gate line to define a pixel area, a thin film transistor provided at the intersection between the gate line and the data line, a pixel electrode connected to the thin film transistor and provided at the pixel area, a gate pad connected to the gate line and formed from a transparent conductive film included in the gate line, a data pad connected to the data line and formed from the transparent conductive film, an alignment film provided at an area other than a pad area including the gate pad and the data pad, and a protective film provided at a lower portion of the alignment film in the same pattern as the alignment film to expose the transparent conductive films of the gate pad and the data pad.

In another aspect, a method of fabricating a liquid crystal display panel device includes providing a lower array substrate having a gate line provided on a substrate, a data line intersecting the gate line and having a gate insulating pattern disposed therebetween to define a pixel area, a thin film transistor provided at the intersection between the gate line and the data line, a protective film for protecting the thin film transistor, a pixel electrode provided at the pixel area and connected to the thin film transistor, a gate pad connected to the gate line and formed from a transparent conductive film included in the gate line, and a data pad connected to the data line and formed from the transparent conductive film, providing a color filter array substrate opposed to the thin film transistor array substrate, joining the thin film transistor array substrate with the color filter array substrate to expose a pad area including the gate pad and the data pad, and exposing the transparent conductive film at the pad area using the color filter array substrate as a mask.

In another aspect, a method of fabricating a liquid crystal display panel device includes providing a lower array substrate having a gate line provided on a substrate, a data line intersecting the gate line and having a gate insulating pattern disposed therebetween to define a pixel area, a thin film transistor provided at the intersection between the gate line and the data line, a protective film for protecting the thin film transistor, a pixel electrode provided at the pixel area and connected to the thin film transistor, a gate pad connected to the gate line and formed from a transparent conductive film included in the gate line, and a data pad connected to the data line and formed from the transparent conductive film, providing a color filter array substrate opposed to the thin film transistor array substrate, joining the thin film transistor array substrate with the color filter array substrate to expose a pad area including the gate pad and the data pad, and exposing the transparent conductive film at the pad area using the color filter array substrate as a mask.

In another aspect, a method of fabricating a liquid crystal display panel device includes forming gate patterns having a gate line, a gate electrode, a gate pad, and a data pad including a transparent conductive film and a pixel electrode on a substrate, forming a semiconductor pattern and a gate insulating pattern on the substrate provided with the gate patterns and the pixel electrode and exposing transparent conductive films included in the data pad, the gate pad, and the pixel electrode, forming a data pattern including the data line, a source electrode, and a drain electrode on the substrate provided with the semiconductor pattern and the gate insulating pattern, forming a protective film along an entire surface of the substrate to protect the thin film transistor, forming an alignment film on the protective film at a remaining area other than a pad area including the gate pad and the data pad, and removing the protective film to cover the pad area using the alignment film as a mask to expose the transparent conductive film included in the pad area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 9A to 9C are cross sectional views of the exemplary second mask process of FIGS. 8A and 8B according to the present invention;

DETAILED DESCRIPTION OF THE PREFERRED EMBODIMENTS

Reference will now be made in detail to the preferred embodiments of the present invention, examples of which are illustrated in the accompanying drawings.

Figure 1:
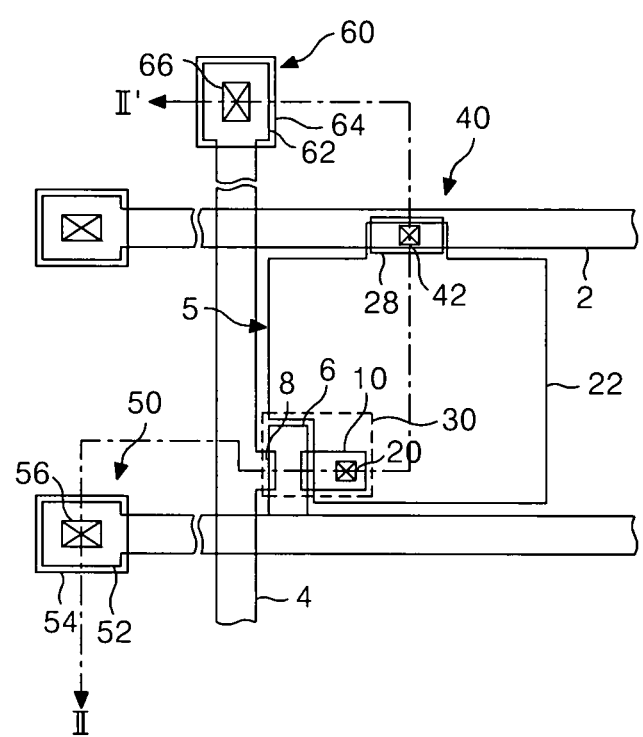
FIG. 1 is a plan view of a lower array substrate of an LCD panel device according to the related art.
Figure 2:
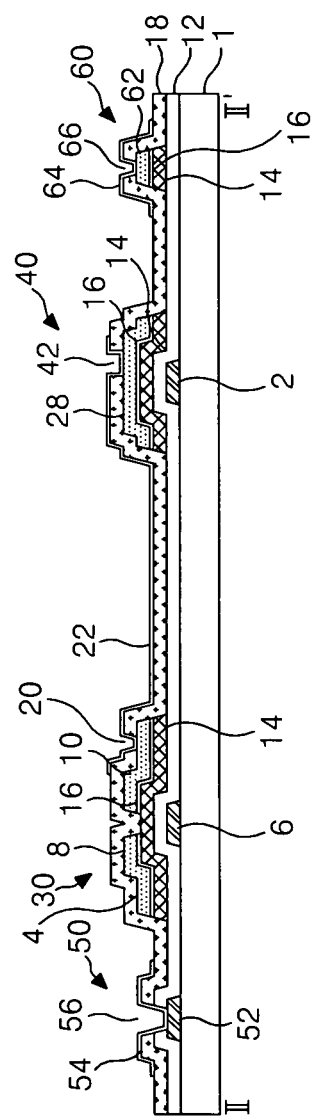
FIG. 2 is a cross sectional view along II-II' of FIG. 1 according to the related art.
Figure 3A:
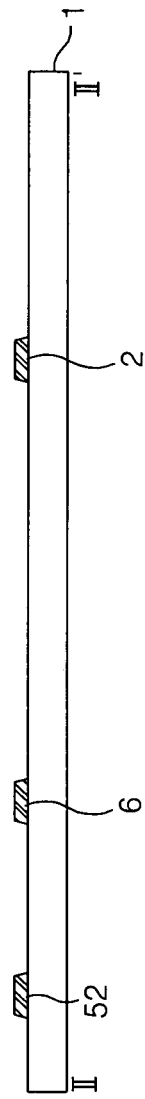
FIGS. 3A to 3D are cross sectional views of a method of fabricating the lower array substrate of FIG. 2 according to the related art.
Figure 3B:
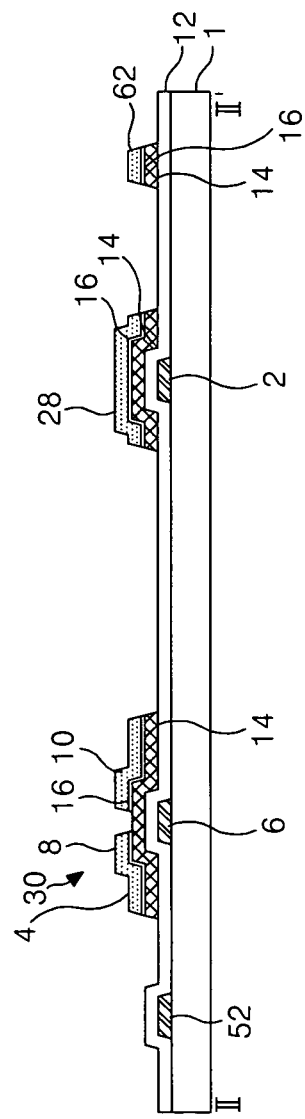
Figure 3C:
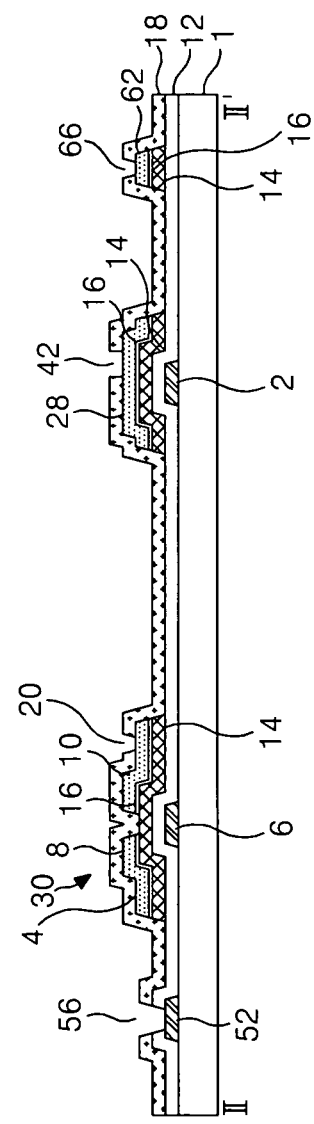
Figure 3D:
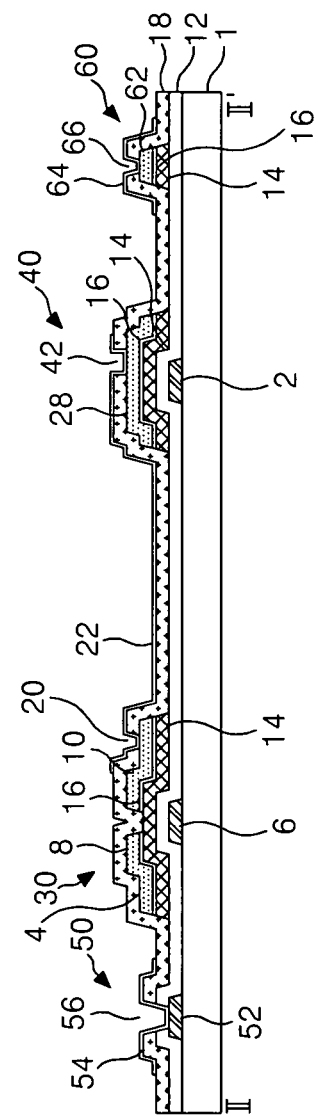
Figure 4:
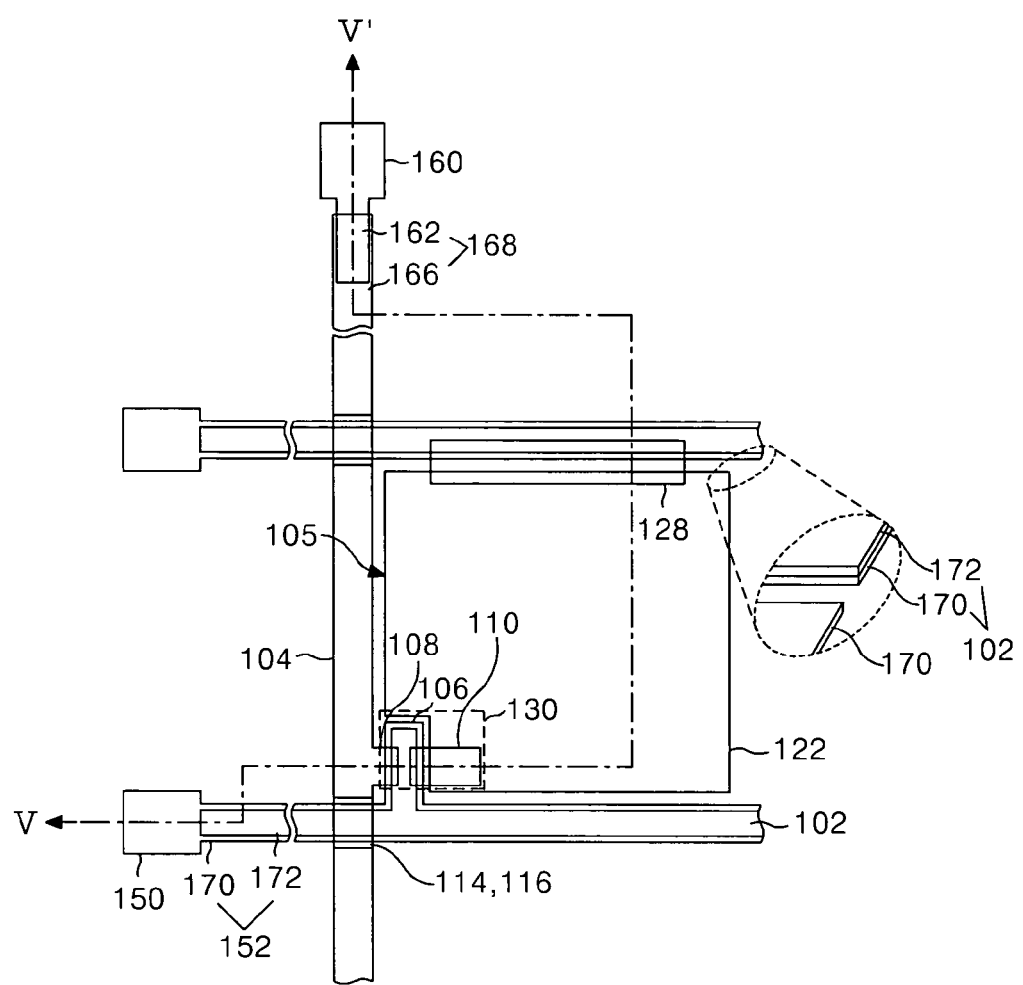
FIG. 4 is a plan view of an exemplary lower array substrate of an LCD panel device according to the present invention.
Figure 5:
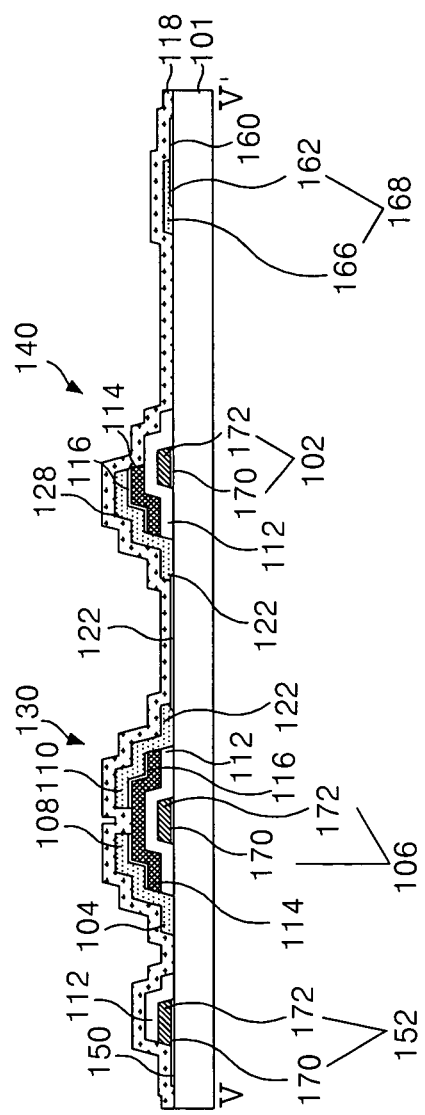
FIG. 5 is a cross sectional view of the lower array substrate along V-V' of FIG. 4 according to the present invention.

FIG. 4 is a plan view of an exemplary lower array substrate of an LCD panel device according to the present invention, and FIG. 5 is a cross sectional view of the lower array substrate along V-V' of FIG. 4 according to the present invention. In FIGS. 4 and 5, a lower array substrate may include a gate line 102 and a data line 104 provided on a lower substrate 101 in such a manner to intersect each other with having a gate insulating pattern 112 therebetween, a TFT 130 provided at each of the intersections, a pixel electrode 122 provided at a pixel area 105 defined by the intersections, a storage capacitor 140 provided at an overlapping portion between the pixel electrode 122 and the gate line 102, a gate pad 150 extending from the gate line 102, and a data pad 160 extending from the data line 104. The gate line 102 may transmit gate signals and the data line 104 may transmit data signals.

The TFT 130 passes pixel signals transmitted along the data line 104 to be charged into the pixel electrode 122, and are maintained in response to gate signals transmitted along the gate line 102. Accordingly, the TFT 130 may include a gate electrode 106 connected to the gate line 102, a source electrode 108 connected to the data line 104, and a drain electrode 110 connected to the pixel electrode 122. Furthermore, the TFT 130 may include semiconductor patterns 114 and 116 overlapping with the gate electrode 106 and having the gate insulating pattern 112 therebetween to define a channel between the source electrode 108 and the drain electrode 110.

The gate pattern may include the gate electrode 106 and the gate line 102 and may include a structure in which a transparent conductive film 170 and a gate metal film 172 may be disposed thereupon. The semiconductor pattern may form a channel between the source electrode 108 and the drain electrode 110, and may include an active layer 114 partially overlapping with the gate pattern and having the gate insulating film 112 therebetween. Furthermore, the semiconductor pattern may be formed on the active layer 114, and may include an ohmic contact layer 116 for making ohmic contact with the data line 104, the storage electrode 128, the source electrode 108, and the drain electrode 110. The semiconductor pattern may be formed separately between adjacent cells to prevent signal interference between the adjacent cells caused by the semiconductor pattern.

The pixel electrode 122 may be formed from the transparent conductive film 170 at the pixel area 105 to be directly connected to the drain electrode 110 of the thin film transistor 130. Accordingly, an electric field may be formed between the pixel electrode 122 to which pixel signals may be supplied via the TFT 130 and a common electrode (not shown) supplied with a reference voltage. Thus, the electric field may rotate liquid crystal molecules of a liquid crystal material disposed between the upper array substrate and the lower array substrate due to dielectric anisotropy of the liquid crystal material. Light transmittance through the pixel area 105 may be differentiated depending upon a rotation degree of the liquid crystal molecules, thereby implementing a gray level scale.

The storage capacitor 140 may include the gate line 102, and a storage electrode 128 overlapping with the gate line 102 and having the gate insulating film 112, the active layer 114, and the ohmic contact layer 116 therebetween, and may be directly connected to the pixel electrode 122. Accordingly, the storage capacitor 140 may allow a pixel signal charged in the pixel electrode 122 to be stably maintained until the next subsequent pixel signal is charged in the pixel electrode 122.

The gate pad 150 may be connected to a gate driver (not shown) to supply gate signals generated from the gate driver, via a gate link 152, to the gate line 120. The gate pad 150 may have a structure in which the transparent conductive film 170 extending from the gate link 152 connected to the gate line 102 may be exposed. Accordingly, the gate link 152 may include the transparent conductive film 170 and the gate metal layer 172 formed on the transparent conductive film 170.

The data pad 160 may be connected to a data driver (not shown) to supply data signals generated from the data driver, via a data link 168, to the data line 104. The data pad 160 may have a structure in which the transparent conductive film 170 extending from the data link 168 connected to the data line 104 may be exposed. Accordingly, the data link 168 may include a lower data link electrode 162 formed from the transparent conductive film 170 and an upper data link electrode 166 connected to the data line 104.

Figure 6A:
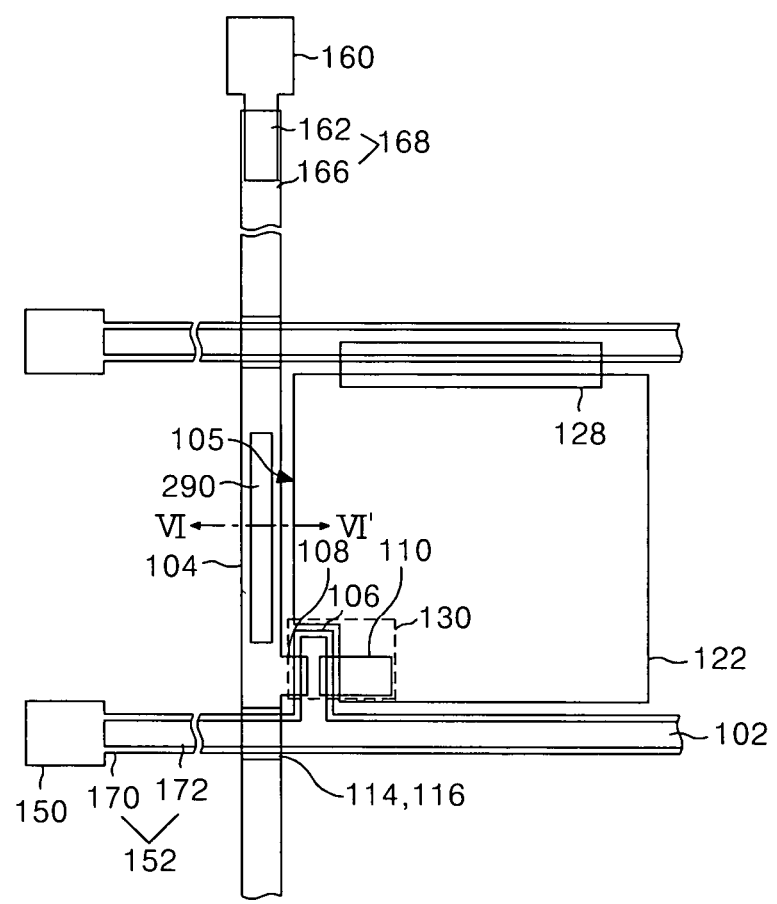
FIGS. 6A and 6B are plan and cross sectional views of an exemplary redundancy line according to the present invention.
Figure 6B:
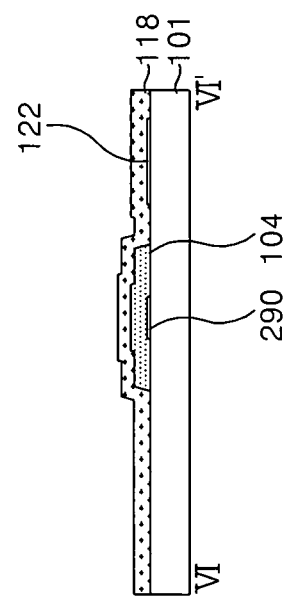

FIGS. 6A and 6B are plan and cross sectional views of an exemplary redundancy line according to the present invention. In FIGS. 6A and 6B, a lower array substrate 101 may include a redundancy line 290 that may be directly connected to the data line 104, and may have a width less than a width of the data line 104 in order to compensate for a resistance of the data line 104. For example, the redundancy line 290 may be formed from the transparent conductive film 170.

Figure 7A:
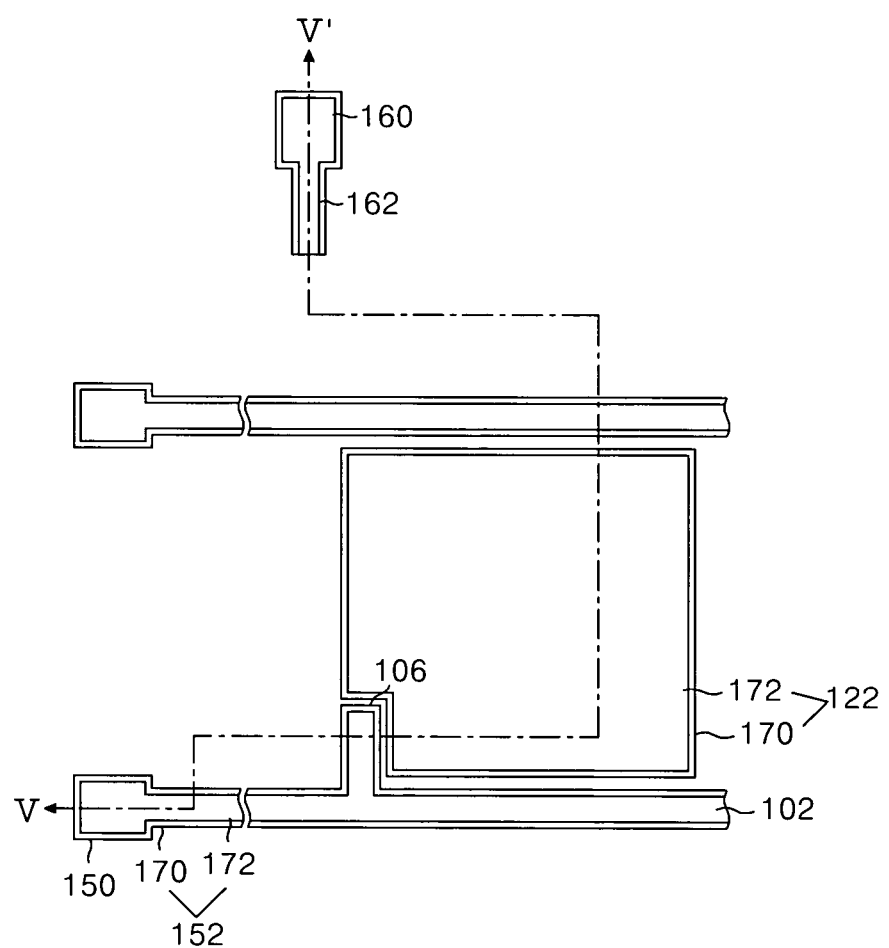
FIGS. 7A and 7B are plan and cross sectional views of an exemplary first mask process of an exemplary method of fabricating a lower array substrate according to the present invention.
Figure 7B:
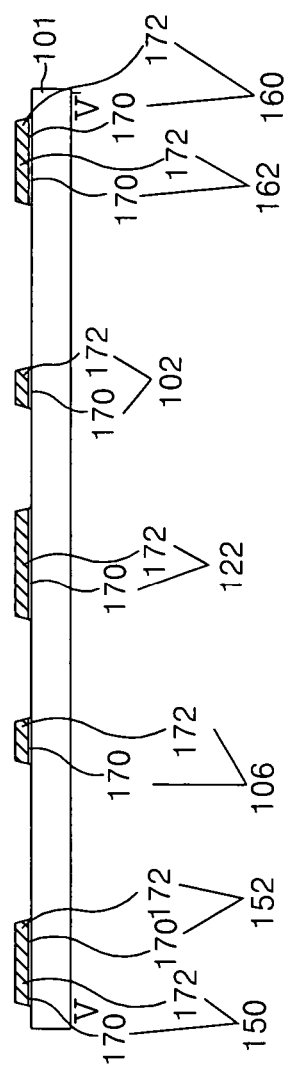

FIGS. 7A and 7B are plan and cross sectional views of an exemplary first mask process of an exemplary method of fabricating a lower array substrate according to the present invention. In FIGS. 7A and 7B, a lower substrate 101 may include a pixel electrode 122, a gate pattern including a gate line 102, a gate electrode 106, a gate link 152, a gate pad 150, a data pad 160, a lower data link electrode 162, and a redundancy line (not shown), each of which may have a double-layer structure, and may be formed using a first mask process. For example, a transparent conductive film 170 and a gate metal film 172 may be sequentially formed on the lower substrate 101 by a deposition technique, such as sputtering. The transparent conductive film 170 may be made from a transparent conductive material, such as indium-tin-oxide (ITO), tin-oxide (TO), indium-tin-zinc-oxide (ITZO), indium-zinc-oxide (IZO), and the gate metal film 172 may include a metal, such as an aluminum group metal including aluminum/neodymium (AlNd), molybdenum (Mo), copper (Cu), chromium (Cr), tantalum (Ta), and titanium (Ti).

Then, the transparent conductive film 170 and the gate metal layer 172 may be patterned by photolithography and etching processes using a first mask to provide the gate line 102, the gate electrode 106, the gate link 152, and the lower data link electrode 162, each of which may have a double-layer structure; and the gate pad 150 including the gate metal film 172, the data pad 160, and the pixel electrode 122.

Figure 8A:
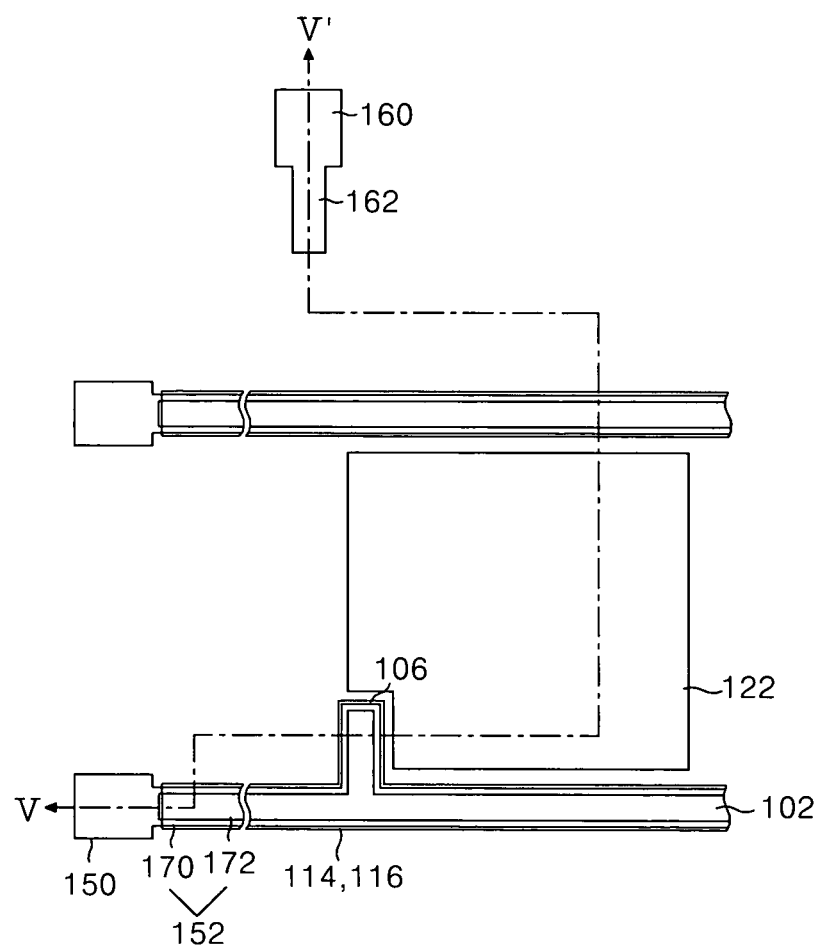
FIGS. 8A and 8B are plan and cross sectional views of an exemplary second mask process of an exemplary method of fabricating a lower array substrate according to the present invention.
Figure 8B:
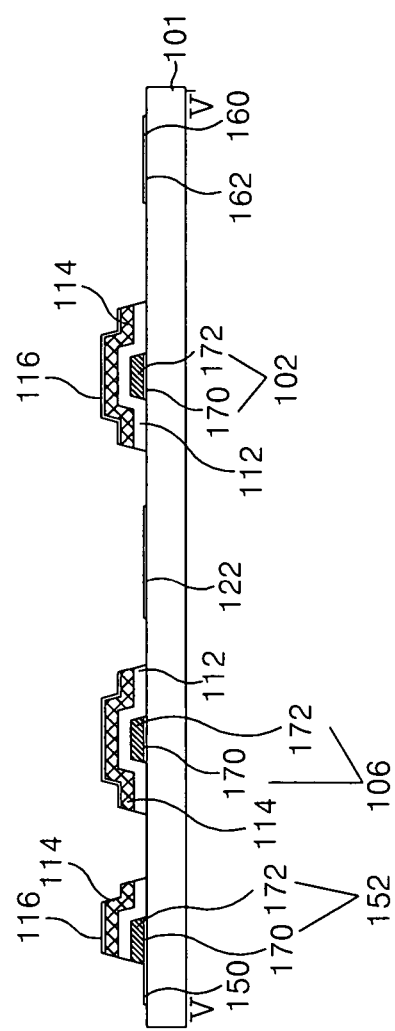

FIGS. 8A and 8B are plan and cross sectional views of an exemplary second mask process of an exemplary method of fabricating a lower array substrate according to the present invention. In FIGS. 8A and 8B, a gate insulating pattern 112, and a semiconductor pattern including an active layer 114 and an ohmic contact layer 116 may be formed on a lower substrate 101 provided with a gate pattern using a second mask process. The gate metal films 172 included in the data pad 160, the lower data link electrode 162, the gate pad 150, and the pixel electrode may be removed to expose the transparent conductive film 170.

Figure 9B:
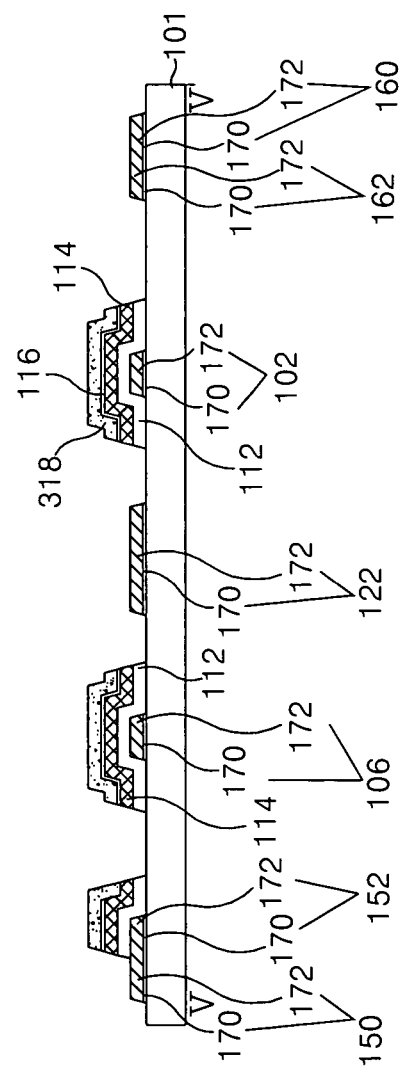
Figure 9C:
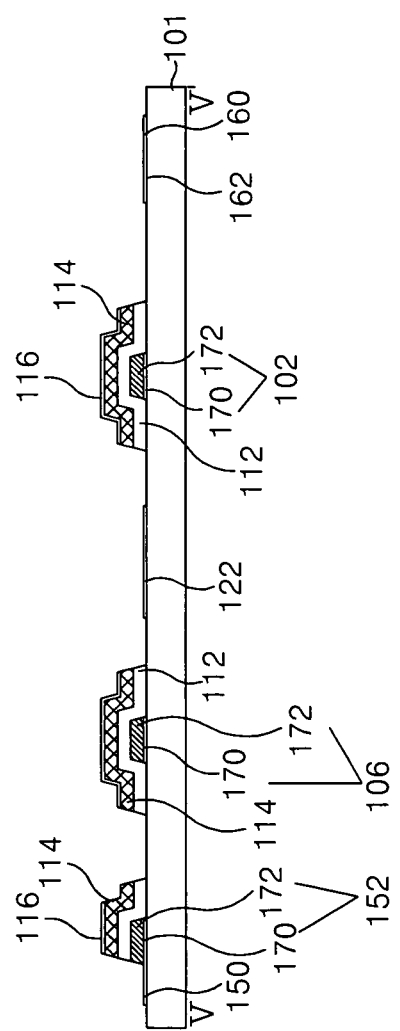

FIGS. 9A to 9C are cross sectional views of the exemplary second mask process of FIGS. 8A and 8B according to the present invention. In FIG. 9A, a gate insulating film 111 and first and second semiconductor layers 115 and 117 may be sequentially formed on a lower substrate 101 provided with the gate pattern using a deposition technique, such as PEVCD or sputtering. For example, the gate insulating film 111 may be made from an inorganic insulating material, such as silicon nitride ($SiN_x$) or silicon oxide ($SiO_x$). In addition, the first semiconductor layer 115 may be formed from undoped amorphous silicon and the second semiconductor layer 117 may be formed from amorphous silicon doped with an N-type or P-type impurities. Subsequently, a photo-resist film 316 may be formed along an entire surface of the second semiconductor layer 117, and a second mask 300 may be aligned at the upper portion of the lower substrate 101. The second mask 300 may include a mask substrate 302 made from a transparent material, and a shielding part 314 provided at a shielding area S2 of the mask substrate 302. Accordingly, an exposure area of the mask substrate 302 may become an exposure area S1.

In FIG. 9B, the photo-resist film 316 using the second mask 300 may be exposed to light and developed, thereby providing a photo-resist pattern 318 corresponding to the shielding part 314 of the second mask 300. Then, the gate insulating film 111 and the first and second semiconductor layers 115 and 117 may be patterned by an etching process using the photo-resist pattern 318. As a result, the gate insulating pattern 112 may overlap the gate pattern including the gate line 102, the gate electrode 106, and the gate link 152, and the semiconductor pattern may include the active layer 114 and the ohmic contact layer 116 and may have a width greater than a width of the gate pattern on the gate pattern, as shown in FIG. 9C. Thus, deterioration of channel characteristics occurring when the semiconductor pattern has a width less than a width of the gate electrode 106 may be prevented.

Then, the exposed gate metal film 172 may be removed by wet etching using the gate insulating pattern 112 and the semiconductor pattern 114 and 116 as a mask. For example, the gate metal films 172 included in the gate pad 150, the data pad 160, the lower data link electrode 162, and the pixel electrode 122 may be removed to expose the transparent conductive films 170 included therein.

Figure 10A:
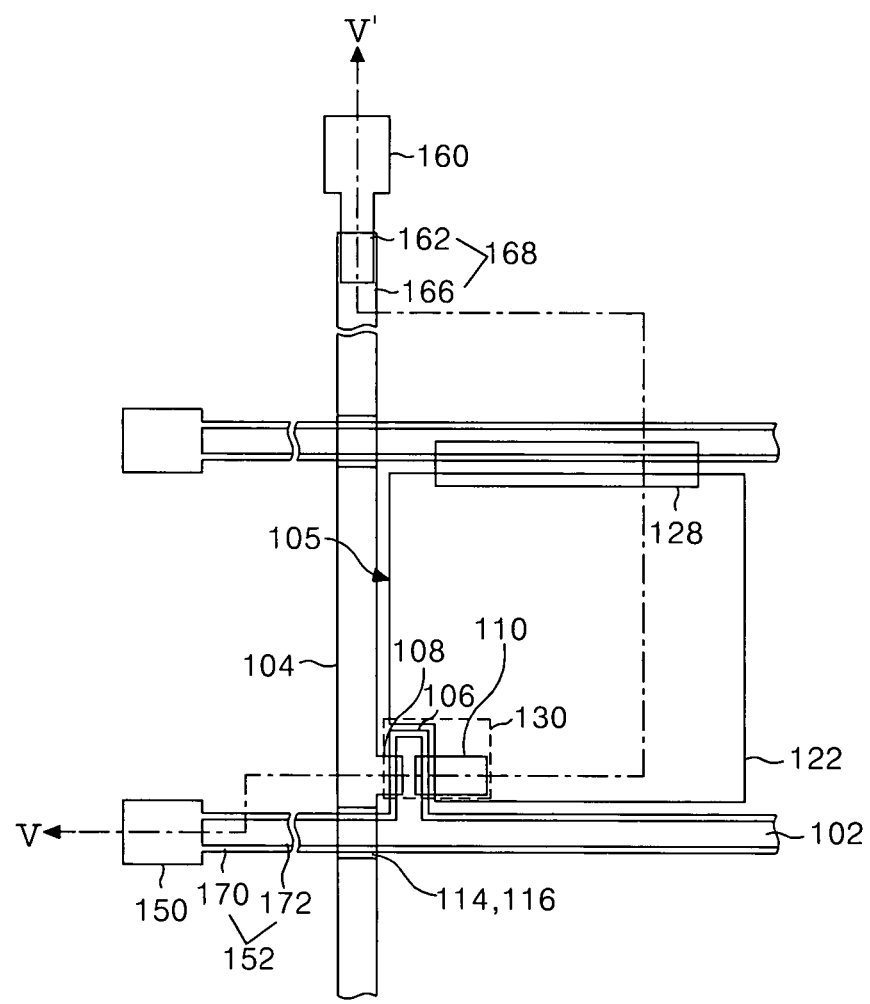
FIGS. 10A and 10B are plan and cross sectional views of an exemplary third mask process of an exemplary method of fabricating a lower array substrate according to the present invention.
Figure 10B:
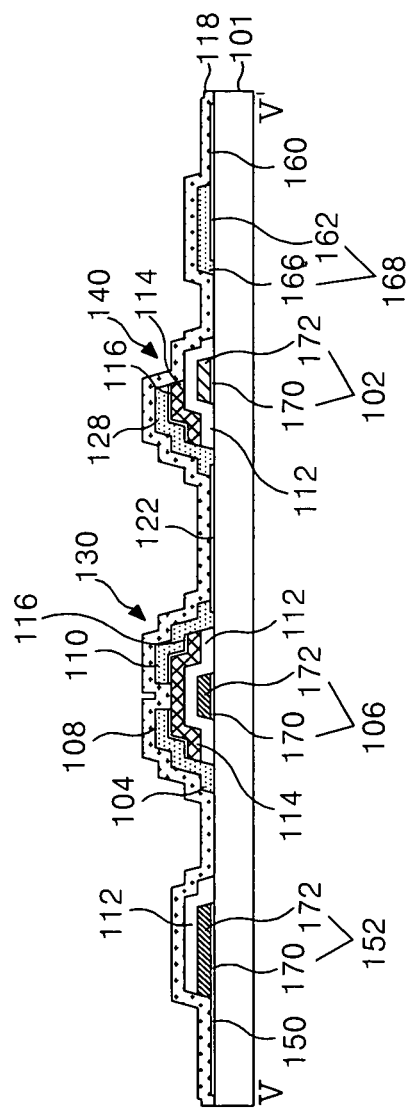

FIGS. 10A and 10B are plan and cross sectional views of an exemplary third mask process of an exemplary method of fabricating a lower array substrate according to the present invention. In FIGS. 10A and 10B, a data pattern including the data line 104, the source electrode 108, the drain electrode 110, the storage electrode 128, and the upper data link electrode 166 may be formed on the lower substrate 101 provided with the gate insulating pattern 112 and the semiconductor pattern using a third mask process.

Figure 11A:
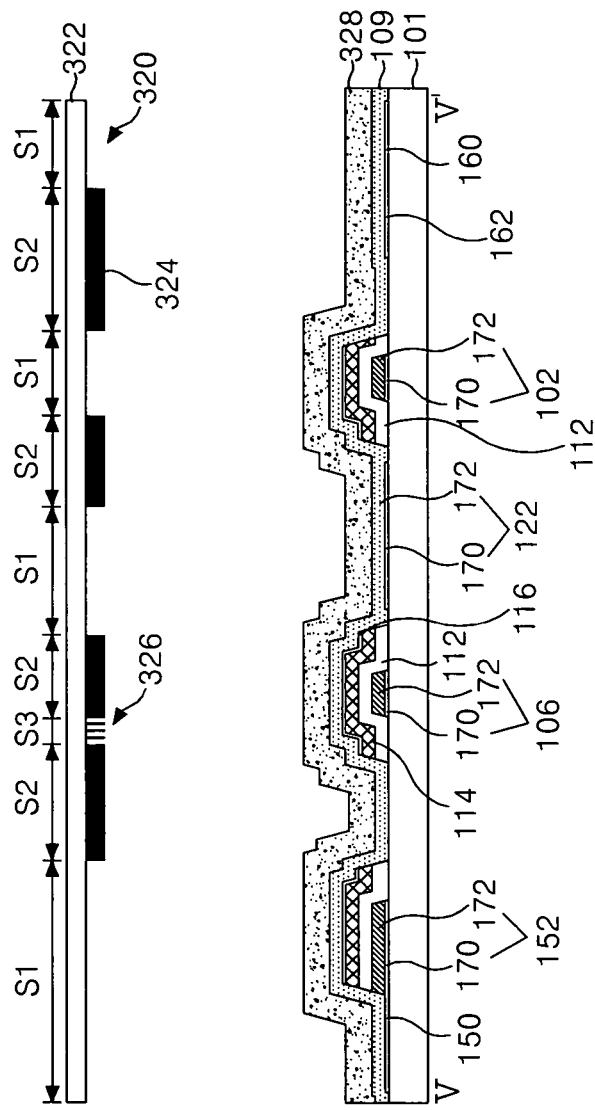
FIGS. 11A to 11E are cross sectional views of the exemplary third mask process of FIGS. 9A and 9B according to the present invention.

FIGS. 11A to 11E are cross sectional views of the exemplary third mask process of FIGS. 9A and 9B according to the present invention. In FIG. 11A, a data metal layer 109 and a photo-resist film 328 may be sequentially formed on the lower substrate 101 provided with the semiconductor pattern by a deposition technique, such as sputtering. For example, the data metal layer 109 may be formed from a metal, such as molybdenum (Mo), copper (Cu) or the like.

Then, a third mask 320 that is a partial exposure mask may be aligned at the upper portion of the lower substrate 101. The third mask 320 may include a mask substrate 322 made from a transparent material, a shielding part 324 provided at a shielding area S2 of the mask substrate 322, and a diffractive exposure part (or transflective part) 326 provided at a partial exposure area S3 of the mask substrate 322. Accordingly, the exposed area of the mask substrate 322 may become the exposure area S1.

Figure 11B:
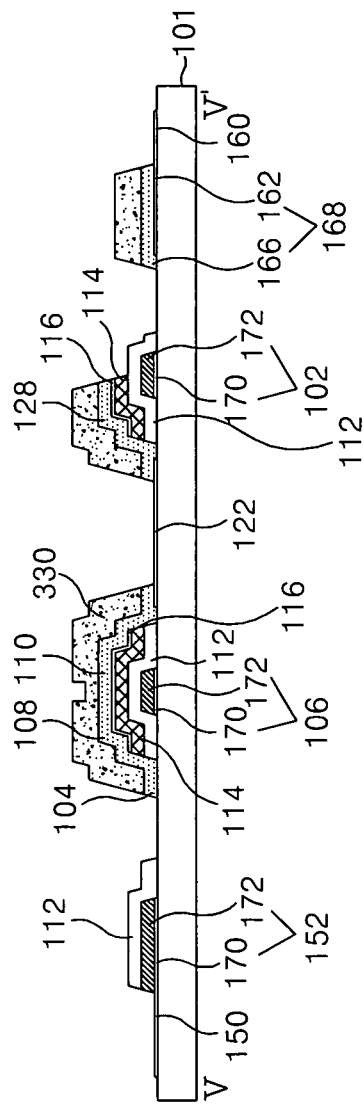

In FIG. 11B, the photo-resist film 328 using the third mask 320 may be exposed to light and developed, thereby providing a photo-resist pattern 330 having step coverage at the shielding area S2 and the partial exposure area S3 corresponding to the shielding part 324 and the diffractive exposure part 326 of the third mask 320. For example, the photo-resist pattern 330 provided at the partial exposure area S3 may have a second height lower than a first height of the photo-resist pattern 330 provided at the shielding area S2.

The data metal layer 109 (in FIG. 11A) may be patterned by a wet etching process using the photo-resist pattern 330 as a mask to provide a data pattern including the storage electrode 128, the data line 104, the source electrode 108, and the drain electrode 110 connected to one side of the data line 104 and the upper data link electrode 166 connected to other side of the data line 104.

Next, the active layer 114 and the ohmic contact layer 116 may be formed along the data pattern by dry etching using the photo-resist pattern 330 as a mask. Accordingly, portions of the active layer 114 and the ohmic contact layer 116 positioned at the remaining area other than the active layer 114 and the ohmic contact layer 116 overlapping with the data pattern may be removed. Thus, a short between adjacent cells may be prevented due to the semiconductor pattern including the active layer 114 and the ohmic contact layer 116.

Figure 11C:
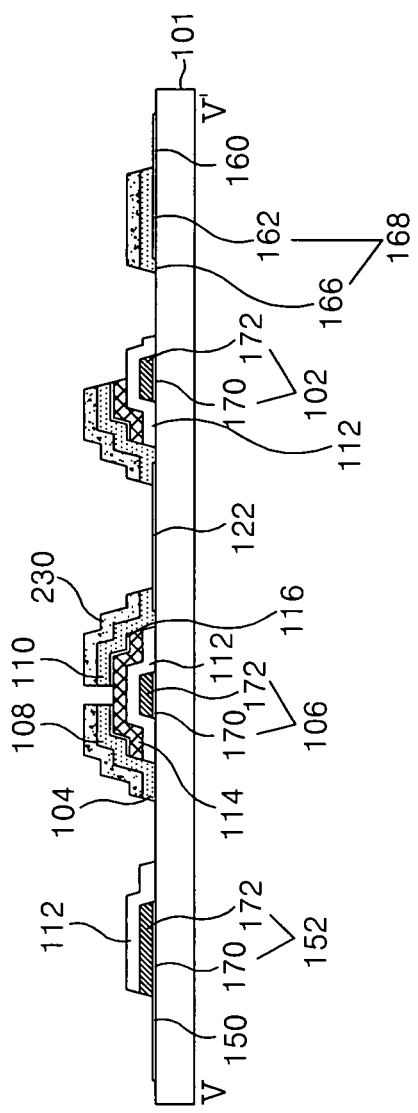

In FIG. 11C, the photo-resist pattern 230 having the second height at the partial exposure area S3 may be formed by an ashing process using an oxygen ($O_2$) plasma, whereas a height of the photo-resist pattern 330 (in FIG. 11B) having the first height at the shielding area S2 may be reduced. The data metal layer and the ohmic contact layer 116 provided at the partial exposure area S3, i.e., at the channel portion of the TFT, may be removed by an etching process using the photo-resist pattern 330, thereby disconnecting the drain electrode 110 from the source electrode 108.

Figure 11D:
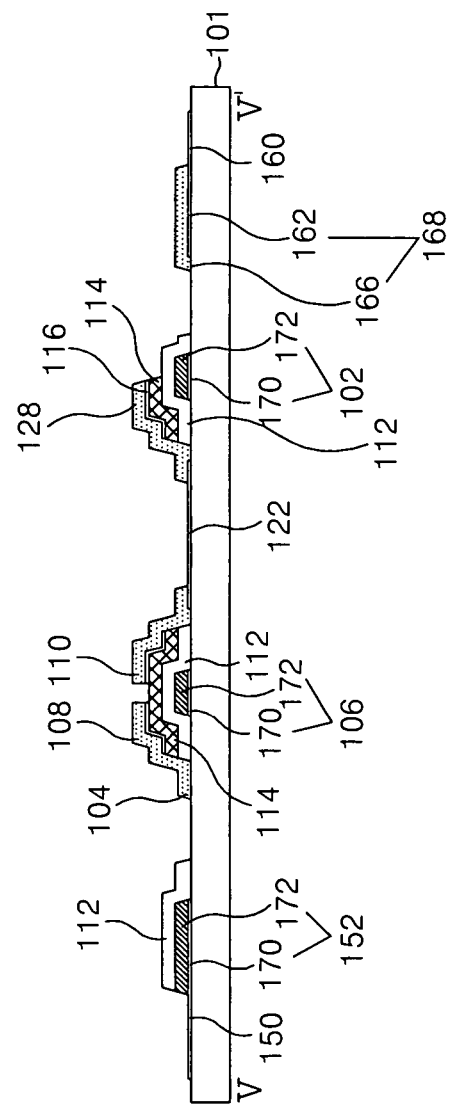

In FIG. 11D, the photo-resist pattern 230 left on the data pattern may be removed by a stripping process.

Figure 11E:
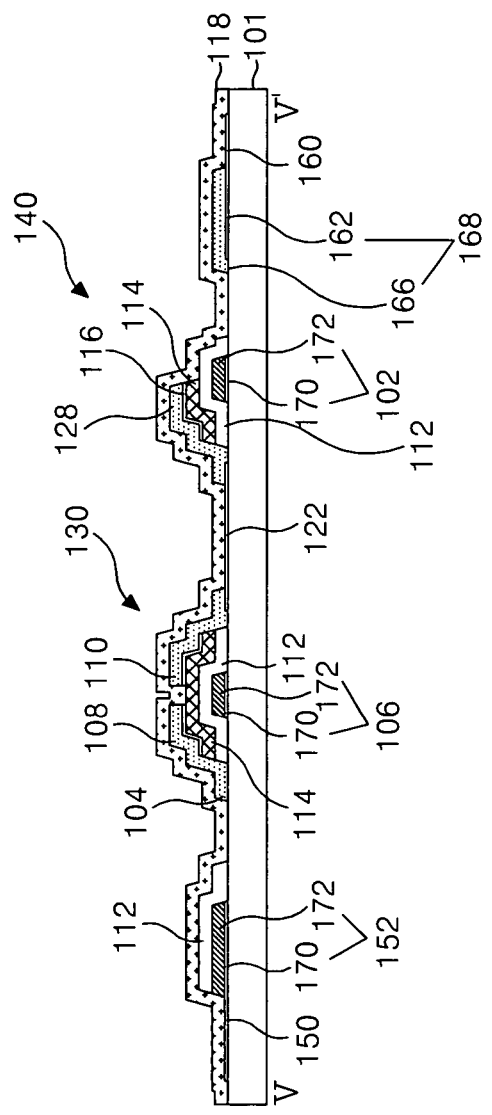

In FIG. 11E, a protective film 118 may be formed along an entire surface of the substrate 101 provided with the data pattern. The protective film 118 may be made from an inorganic insulating material identical to the gate insulating pattern 112, or an organic insulating material, such as an acrylic organic compound having a small dielectric constant, benzocyclobutene (BCB) or perfluorocyclobutane (PFCB).

Figure 12:
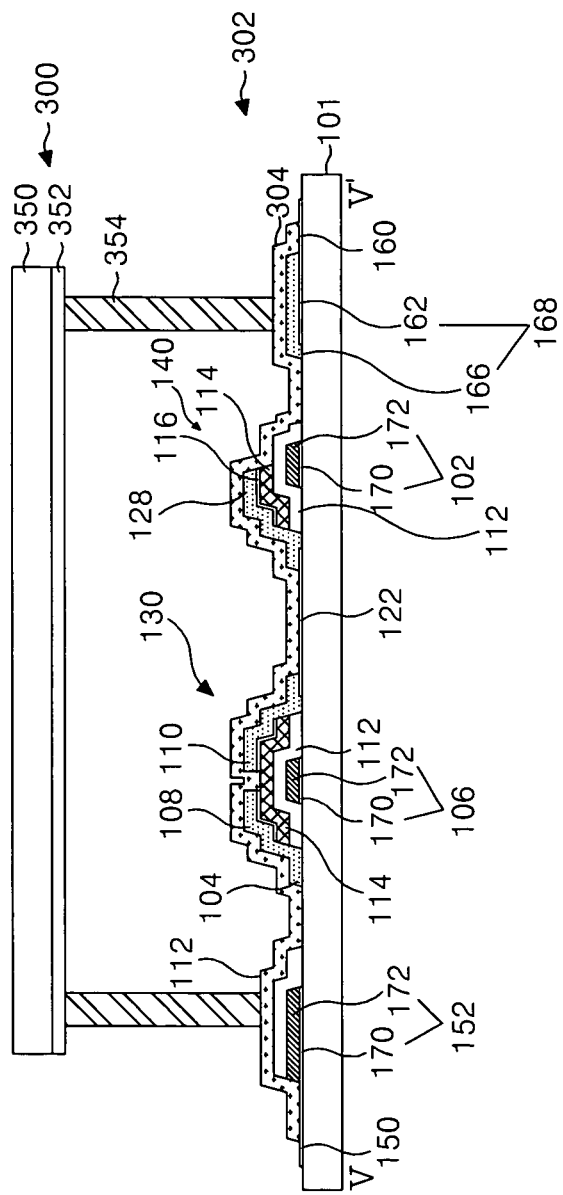
FIG. 12 is a cross sectional view of an exemplary LCD panel device including the exemplary lower array substrate of FIG. 5 according to the present invention.

FIG. 12 is a cross sectional view of an exemplary LCD panel device including the exemplary lower array substrate of FIG. 5 according to the present invention. In FIG. 12, an LCD panel device may include an upper array substrate 300 and a lower array substrate 302 that are joined to each other by a sealant 354. The upper array substrate 300 may include an upper array 352 including black matrices, color filters, and common electrodes provided on an upper substrate 350. The lower array substrate 302 may be provided such that an area thereof overlapping with the upper array substrate 300 may be protected by a protective pattern 304 and the transparent conductive film 170 included in at least one of the gate pad 150, the data pad 160, and the common pad 180 at a pad area that does not overlap with the upper array substrate 300 may be exposed.

An exemplary method of fabricating an LCD panel device may include separate preparation of the upper array substrate 300 and the lower array substrate 302, joining together of the upper and lower array substrates 300 and 302 using a sealant 354. Then, a protective film 118 of the lower array substrate 302 may be patterned by a pad opening process using the lower array substrate 300 as a mask to provide a protective pattern 304 at the display area and expose the transparent conductive film 170 included in any one of the gate pad 150, the data pad 160, and the common pad 180 at the pad area.

Next, the pad opening process may sequentially scan each pad exposed by the upper array substrate 300 using a plasma generated by an atmosphere plasma generator, or may collectively scan each pad, thereby exposing the transparent conductive films 170 of the gate pad 150 and the data pad 160.

Alternatively, a plurality of liquid crystal cells made by a joining of the upper array substrate 300 with the lower array substrate 302 may be introduced into a chamber. Then, the protective film 118 at the pad area may be exposed by the upper array substrate 300 using a normal-pressure plasma, thereby exposing the transparent conductive films 170 of the gate pad 150 and the data pad 160. Furthermore, the entire LCD panel device in which the upper array substrate 300 and the lower array substrate 302 are joined with each other may be immersed into an etching liquid. Alternatively, the pad area including the gate pad 150, the data pad 160, and the common pad 180 may only be immersed into the etching liquid, thereby exposing the transparent conductive films 170 of the gate pad 150 and the data pad 160.

Figure 13:
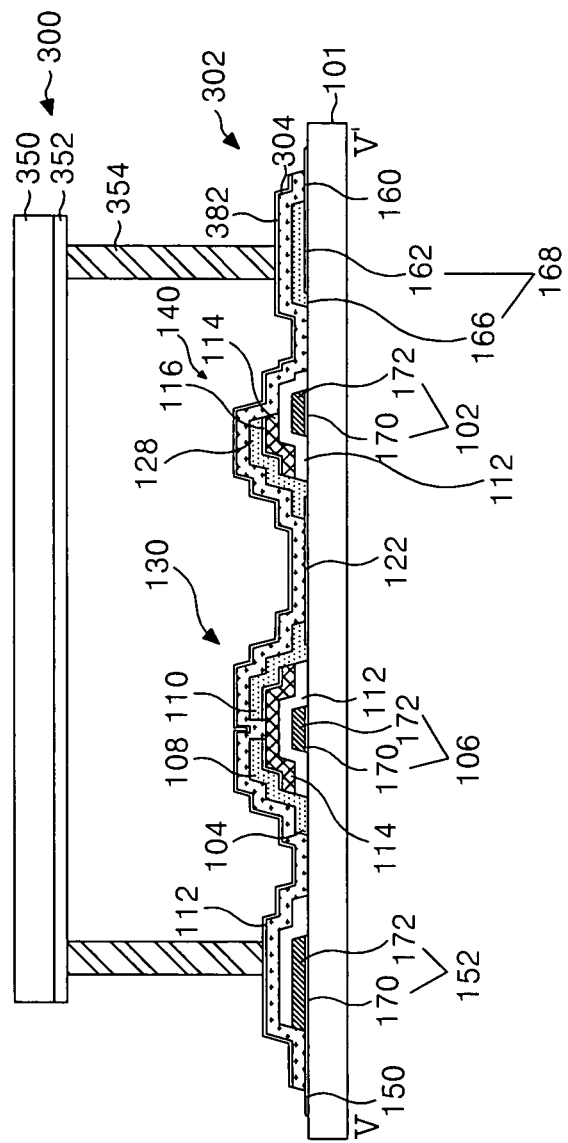
FIG. 13 is a cross sectional view of another exemplary LCD panel device including the lower array substrate of FIG. 5 according to the present invention.

FIG. 13 is a cross sectional view of another exemplary LCD panel device including the lower array substrate of FIG. 5 according to the present invention. In FIG. 13, an LCD panel device may include a upper array substrate 300 and a lower array substrate 302 that are joined to each other by a sealant 354. The lower array substrate 302 may be provided such that a display area defined by an alignment film 382 may be protected by a protective pattern 304. In addition, the transparent conductive film 170 included in any one of the gate pad 150, the data pad 160, and the common pad at a pad area included in an area where it does not overlap with the alignment film 382 may be exposed. In the upper array substrate 300, an upper array 352 may include black matrices, color filters, and common electrodes provided on an upper substrate 350.

An exemplary method of fabricating an LCD panel device may include a lower array substrate 302 formed by first, second, and third mask processes. The lower array substrate 302 may be cleaned by a cleaning liquid, and an alignment film 382, such as polyimide, may be printed on the remaining area other than the pad area. The protective film 118 at the pad area may be patterned by an etching process using the alignment film 282 as a mask to provide the protective pattern 304 for exposing the transparent conductive films 170 of the gate pad 150 and the data pad 160. A gas used upon the etching process may include $SF_6$. Next, the alignment film 382 may be rubbed along a predetermined direction, and the lower array substrate 302 with the alignment film 382 may be joined with a separately prepared upper array substrate 300 to complete the LCD panel device.

Figure 14:
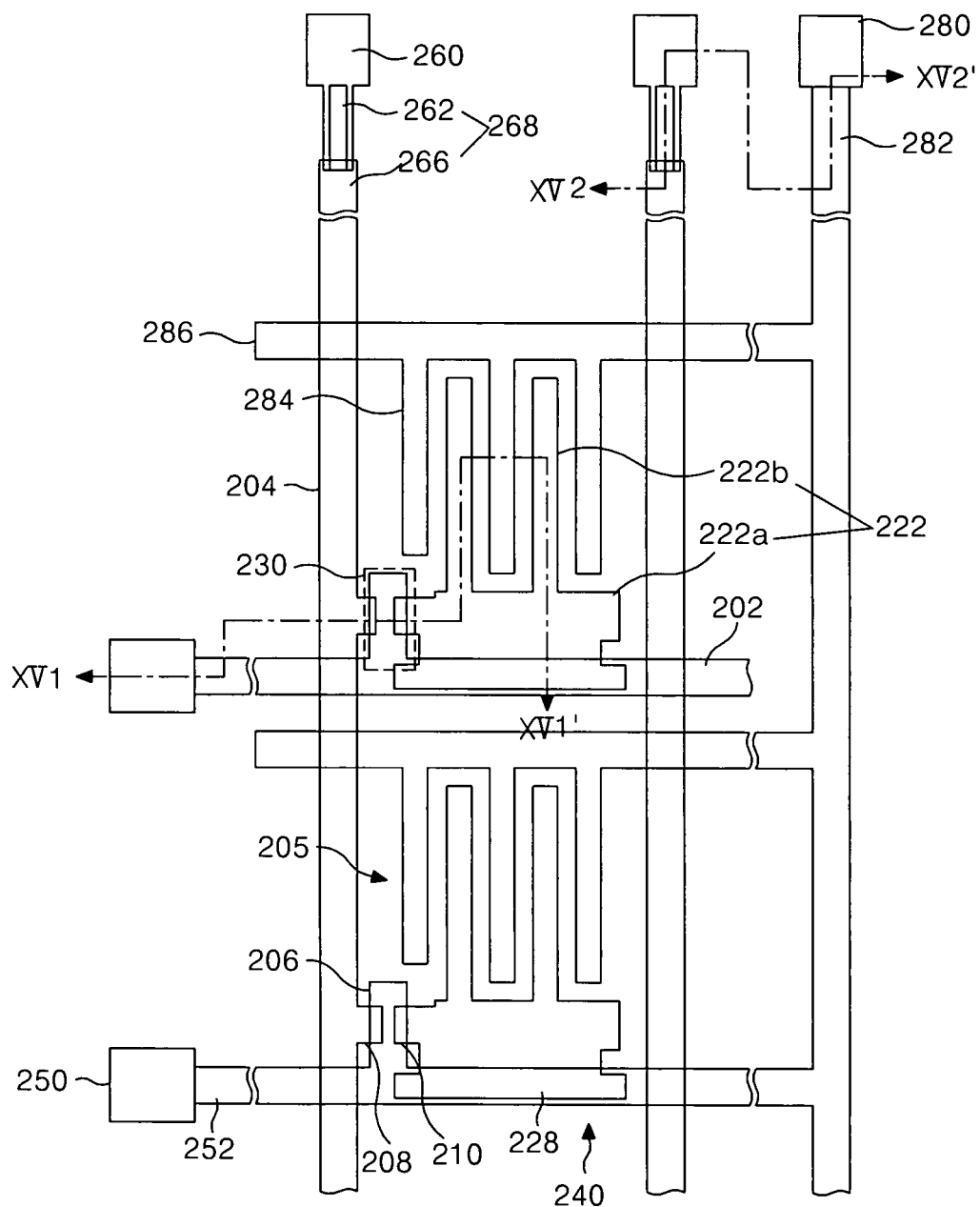
FIG. 14 is a plan view of another exemplary lower array substrate of an LCD panel device according to the present invention.
Figure 15:
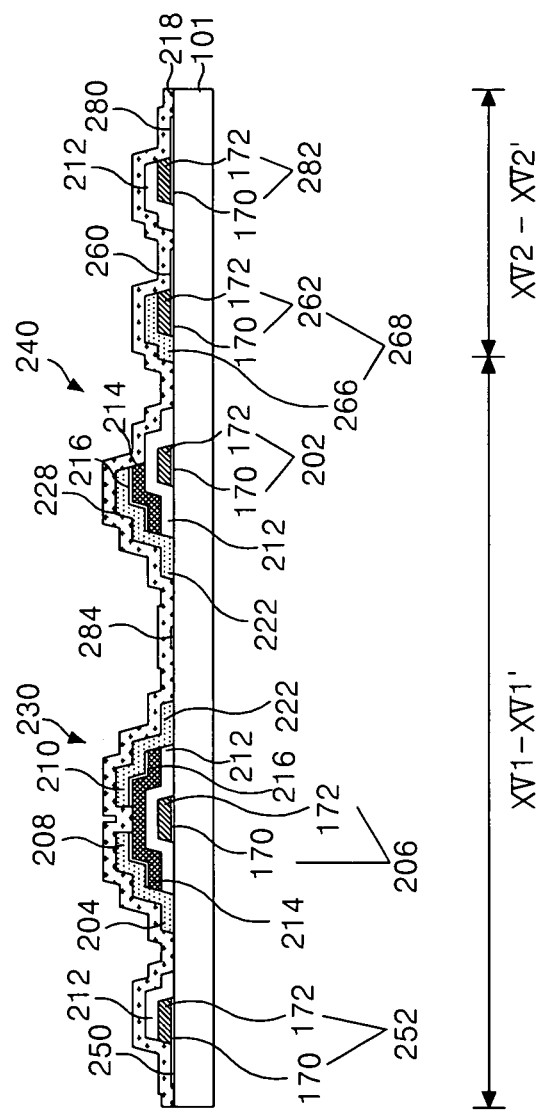
FIG. 15 is a cross sectional view along of the lower array substrate taken along XV1-XV1' and XV2-XV2' of FIG. 14 according to the present invention.

FIG. 14 is a plan view of another exemplary lower array substrate of an LCD panel device according to the present invention, and FIG. 15 is a cross sectional view along of the lower array substrate taken along XV1-XV1' and XV2-XV2' of FIG. 14 according to the present invention. In FIGS. 14 and 15, a lower array substrate may include a gate line 202 and a data line 204 provided on a lower substrate 101 in such a manner to intersect each other and having a gate insulating pattern 212 therebetween, a TFT 230 provided at each of the intersections, a pixel electrode 222 and a common electrode 284 provided at a pixel area 205 defined by the intersections in such a manner to make a horizontal electric field, and a common line 286 connected to the common electrode 284. Furthermore, the lower array substrate may include a storage capacitor 240 provided at an overlapping portion between a storage electrode 228 and the common line 286, a gate pad 250 extending from the gate line 202, a data pad 260 extending from the data line 204, and a common pad 280 extending from the common line 286. The gate line 202 may supply gate signals and the data line 204 may supply data signals. In addition, the common line 286 may supply a reference voltage for driving liquid crystal material, and may be provided in parallel to the gate line 202 with the pixel area 205 disposed therebetween.

The TFT 230 may allow pixel signals transmitted along the data line 204 to be charged to the pixel electrode 222, and may be maintained in response to gate signals transmitted along the gate line 202. Accordingly, the TFT 230 may include a gate electrode 206 connected to the gate line 202, a source electrode 208 connected to the data line 204, and a drain electrode 210 connected to the pixel electrode 222. Furthermore, the TFT 230 may include an active layer 214 overlapping with the gate electrode 206 and having the gate insulating pattern 212 therebetween to define a channel between the source electrode 208 and the drain electrode 210, wherein the active layer 214 may also overlap the storage electrode 228. In addition, an ohmic contact layer 216 for making electrical contact to the drain electrode 210 and the storage electrode 228 may be provided on the active layer 214.

The pixel electrode 222 may be integral to both the drain electrode 210 of the TFT 230 and the storage electrode 228 to be provided at the pixel area 205. For example, the pixel electrode 222 may include a horizontal part 222a that may extend from the drain electrode 210 in parallel to an adjacent gate line 202, and a finger part 222b that may extend along a vertical direction from the horizontal part 222a. In addition, the common electrode 284 may be connected to the common line 286 to be provided at the pixel area 205. For example, the common electrode 284 may be provided in parallel to the finger part 222b of the pixel electrode 222 at the pixel area 205. Accordingly, an electric field may be generated between the pixel electrode 222 to which pixel signals may be applied via the TFT 230 and the common electrode 284 to which a reference voltage may be supplied via the common line 286. For example, a horizontal electric field may be formed between the finger part 222b of the pixel electrode 222 and the common electrode 284. Accordingly, the electric field may rotate liquid crystal molecules of a liquid crystal material between the upper array substrate and the lower array substrate due to dielectric anisotropy of the liquid crystal material. Thus, light transmittance through the pixel area 205 may be differentiated depending upon a degree of rotation of the liquid crystal molecules, thereby implementing a gray level scale.

The storage capacitor 240 may include the gate line 202, and the storage electrode 228 overlapping with the gate line 202 and having the gate insulating film 212, the active layer 214, and the ohmic contact layer 216 disposed therebetween, and may be integral to the pixel electrode 222. The storage capacitor 240 may allow a pixel signal charged in the pixel electrode 222 to be stably maintained until the next subsequent pixel signal is charged in the pixel electrode 222.

The gate pad 250 may be connected to a gate driver (not shown) to supply gate signals generated from the gate driver, via a gate link 252, to the gate line 202. The gate pad 250 may have a structure in which the transparent conductive film 170 extending from the gate link 252 connected to the gate line 202 may be exposed. Accordingly, the gate link 252 may include the transparent conductive film 170, and the gate metal layer 172 formed on the transparent conductive film 170.

The data pad 260 may be connected to a data driver (not shown) to supply data signals generated from the data driver, via a data link 268, to the data line 204. The data pad 260 may have a structure in which the transparent conductive film 170 extending from the data link 268 connected to the data line 204 may be exposed. Accordingly, the data link 268 may include a lower data link electrode 262 having the transparent conductive film 170 and the data metal layer 172 formed on the transparent conductive film 170, and an upper data link electrode 266 connected to the data line 204.

The common pad 280 may be connected to the gate driver (not shown) to supply gate signals generated from the gate driver, via a common link 282, to the common line 286. The common pad 280 may have a structure in which the transparent conductive film 170 extending from the common link 282 connected to the common line 286 may be exposed. Accordingly, the common link 282 may include the transparent conductive film 170, and the gate metal layer 172 formed on the transparent conductive film 170.

Figure 16A:
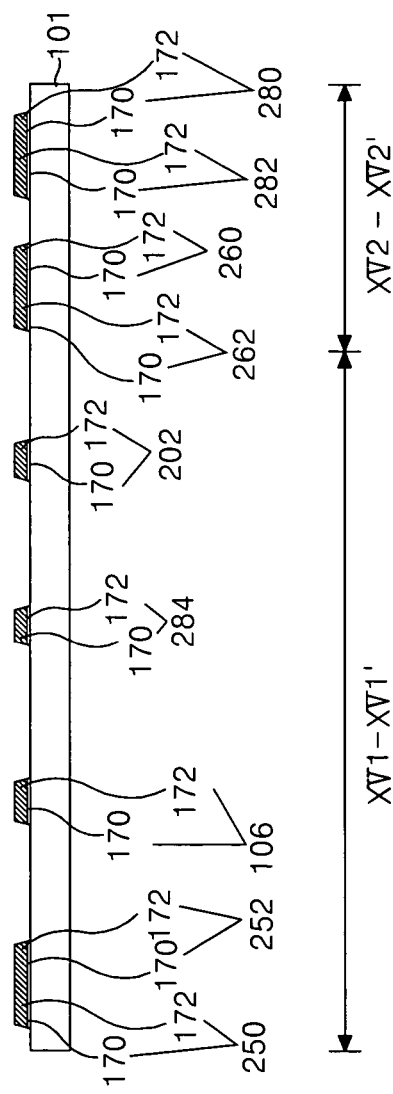
FIGS. 16A to 16C are cross sectional views of an exemplary method of fabricating the lower array substrate of FIG. 15 according to the present invention.
Figure 16B:
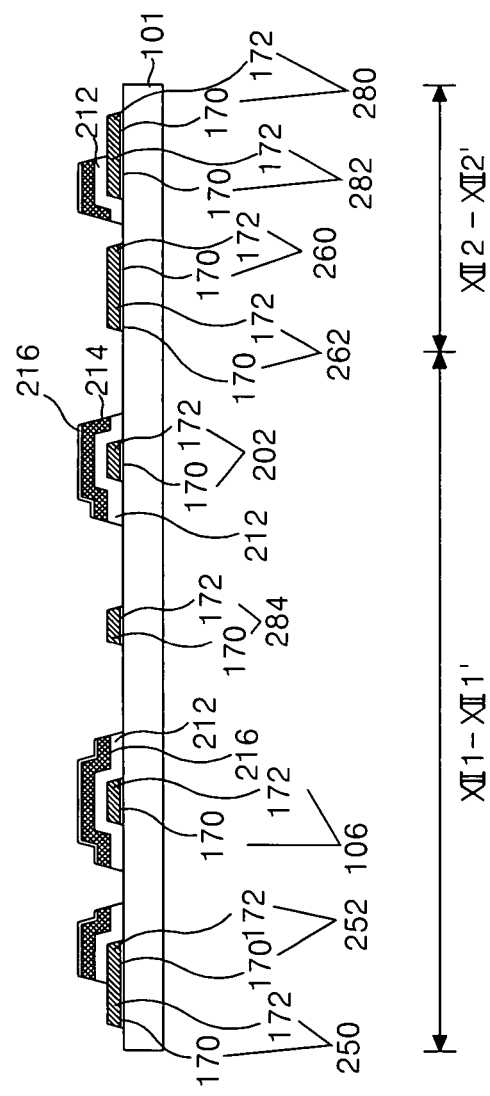
Figure 16C:
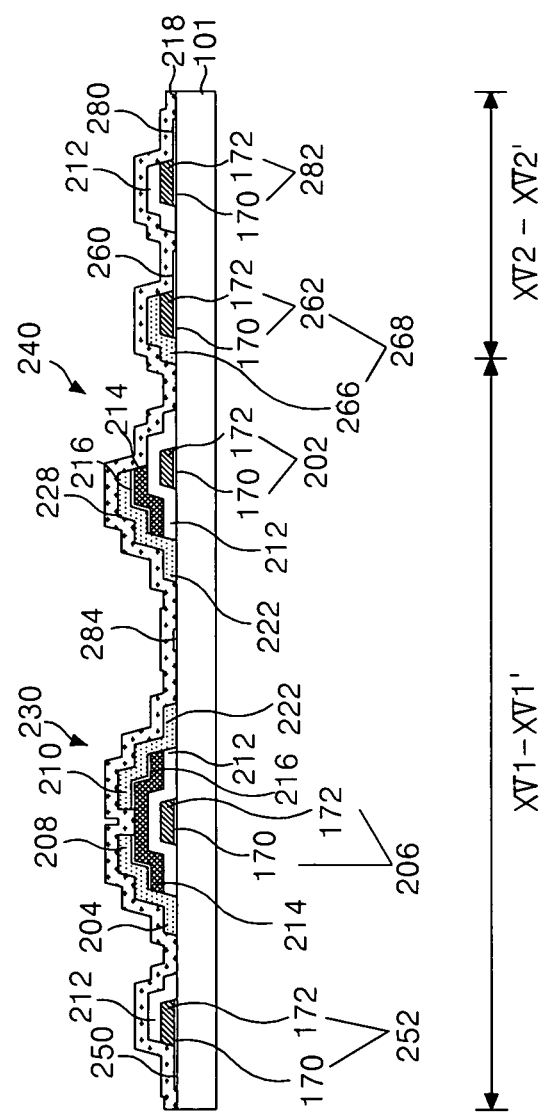

FIGS. 16A to 16C are cross sectional views of an exemplary method of fabricating the lower array substrate of FIG. 15 according to the present invention. In FIG. 16A, the pixel electrode 222 (in FIG. 14), the gate pattern including the gate line 202, the gate electrode 206, the gate link 252, the gate pad 250, the data pad 260, the lower data link electrode 262, the common electrode 284, the common line 286 (in FIG. 14), the common link 282, and the common pad 280, each of which may have a double-layer structure, may be formed on the lower substrate 101 using a first mask process. For example, the transparent conductive film 170 and the gate metal film 172 may be sequentially formed on the lower substrate 101 by a deposition technique, such as sputtering. Accordingly, the transparent conductive film 170 may be made from a transparent conductive material, such as indium-tin-oxide (ITO), tin-oxide (TO), indium-tin-zinc-oxide (ITZO), indium-zinc-oxide (IZO) or the like, while the gate metal film 172 may be made from a metal, such as an aluminum group metal including aluminum/neodymium (AlNd), molybdenum (Mo), copper (Cu), chromium (Cr), tantalum (Ta), titanium (Ti) or the like.

Then, the transparent conductive film 170 and the gate metal layer 172 may be patterned by photolithography and etching processes using a first mask, thereby providing a gate pattern including the gate line 202, the gate electrode 206, the gate link 252, the gate pad 250, the data pad 260, the lower data link electrode 262, the common electrode 284, the common line 286 (in FIG. 14), the common link 282, and the common pad 280, each of which may have a double-layer structure; and the pixel electrode 222 including the gate metal film 172.

In FIG. 16B, a gate insulating pattern 212 and a semiconductor pattern including the active layer 214 and the ohmic contact layer 216 may be formed on the lower substrate 101 provided with the gate pattern by a second mask process. For example, a gate insulating film and first and second semiconductor layers may be sequentially formed on the lower substrate 101 provided with the gate pattern by a deposition technique, such as PEVCD or sputtering. Accordingly, the gate insulating film may be formed from an inorganic insulating material, such as silicon nitride ($SiN_x$) or silicon oxide ($SiO_x$). The first semiconductor layer may be formed from undoped amorphous silicon and the second semiconductor layer may be formed from amorphous silicon doped with an N-type or P-type impurities.

Subsequently, the gate insulating film and the first and second semiconductor layers may be patterned by an etching process using a second mask to provide the gate insulating pattern 212 overlapping with the gate pattern including the gate line 202, the gate electrode 206, the gate link 252, and the common link 282, and the semiconductor pattern including the active layer 214 and the ohmic contact layer 216 and having a width greater than a width of the gate pattern on the gate insulating pattern 212. Accordingly, deterioration of channel characteristics occurring when the semiconductor pattern has a width less than a width of the gate electrode 206 may be prevented.

In FIG. 16C, a data pattern including the data line 204, the source electrode 208, the drain electrode 210, the storage electrode 228, the upper data link electrode 266, and the pixel electrode 222 may be formed on the lower substrate 101 provided with the gate insulating pattern 212 and the semiconductor pattern using a third mask process. The gate metal films 172 included in the data pad 260, the gate pad 250, the common pad 280, and the common electrode 282 may be removed to expose the transparent conductive film 170.

Figure 17A:
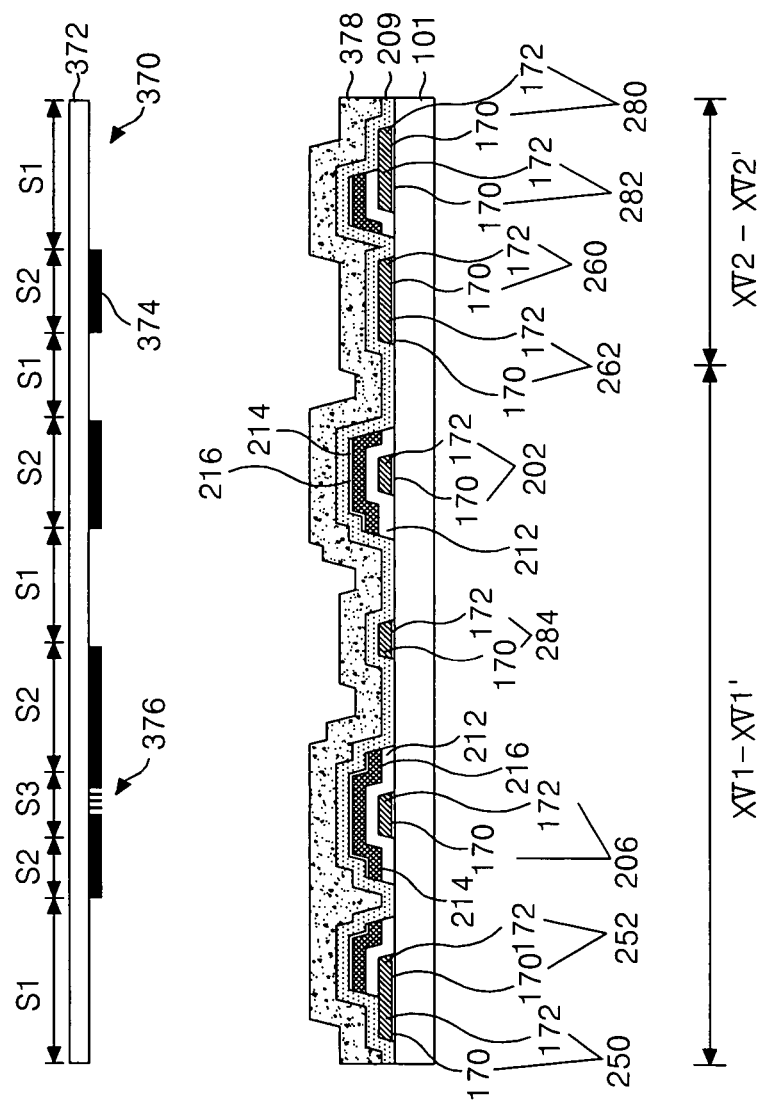
FIGS. 17A to 17E are cross sectional views of an exemplary third mask process of FIG. 16C according to the present invention.

FIGS. 17A to 17E are cross sectional views of an exemplary third mask process of FIG. 16C according to the present invention. In FIG. 17A, a data metal layer 209 and a photo-resist film 378 may be sequentially formed on the lower substrate 101 provided with the semiconductor pattern by a deposition technique, such as sputtering. Accordingly, the data metal layer 209 may be formed from a metal, such as molybdenum (Mo), copper (Cu) or the like. Then, a third mask 370 that is a partial exposure mask may be aligned at the upper portion of the lower substrate 101. The third mask 370 may include a mask substrate 372 made from a transparent material, a shielding part 374 provided at a shielding area S2 of the mask substrate 372, and a diffractive exposure part (or transflective part) 376 provided at a partial exposure area S3 of the mask substrate 372. Accordingly, the exposed area of the mask substrate 372 may become the exposure area S1.

Figure 17B:
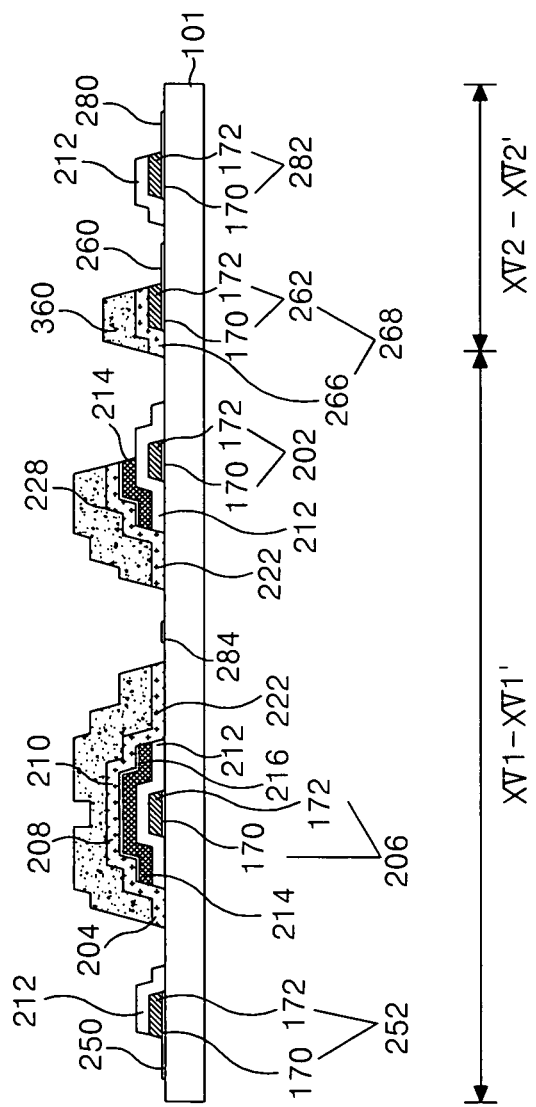

In FIG. 17B, the photo-resist film 378 using the third mask 370 may be exposed and developed, thereby providing a photo-resist pattern 360 having step coverage at the shielding area S2 and the partial exposure area S3 corresponding to the shielding part 374 and the diffractive exposure part 376 of the third mask 370. For example, the photo-resist pattern 360 provided at the partial exposure area S3 may have a second height lower than a first height of the photo-resist pattern 360 provided at the shielding area S2.

Then, the data metal layer 209 may be patterned by a wet etching process using the photo-resist pattern 360 as a mask to provide a data pattern including the storage electrode 228, the data line 204, the source electrode 208, and the drain electrode 210 connected to one side of the data line 204 and the upper data link electrode 266 connected to other side of the data line 204. The gate metal film 172 provided at the lower portion of the data pattern may be removed by utilizing the gate insulating pattern 212 as a mask to expose the transparent conductive films 170 included in the data pad 260, the gate pad 250, the common pad 280, and the common electrode 284.

Next, the active layer 214 and the ohmic contact layer 216 my be formed along the data pattern by dry etching using the photo-resist pattern 360 as a mask. Accordingly, the active layer 214 and the ohmic contact layer 216 positioned at the remaining area other than the active layer 214 and the ohmic contact layer 216 overlapping with the data pattern may be removed. Thus, a short between adjacent cells caused by the semiconductor pattern including the active layer 214 and the ohmic contact layer 216 may be prevented.

Figure 17C:
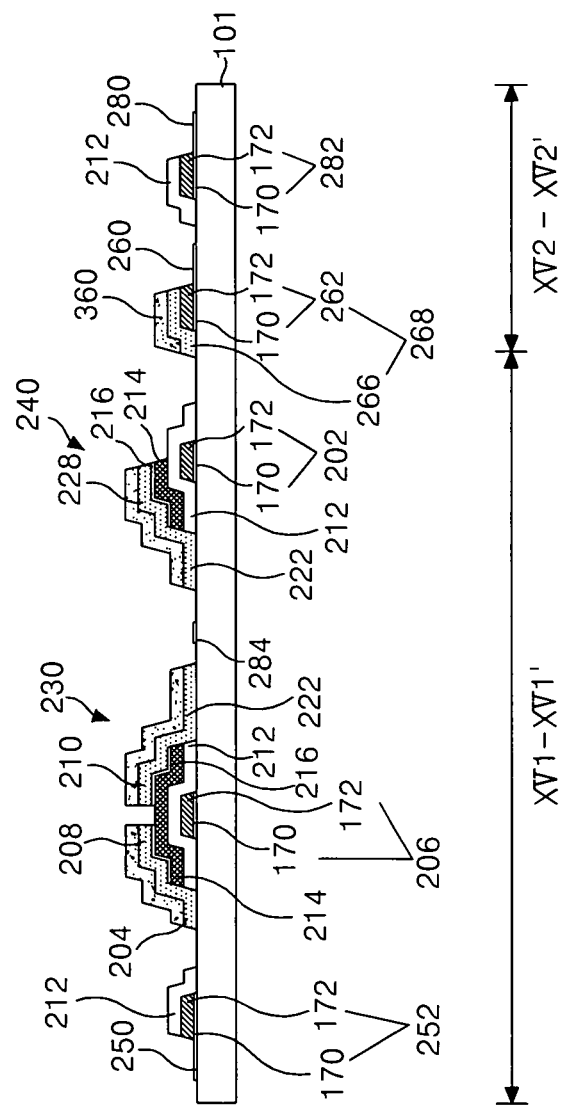

In FIG. 17C, the photo-resist pattern 360 having the second height h2 at the partial exposure area S3 may be removed by an ashing process using an oxygen ($O_2$) plasma, whereas a height of the photo-resist pattern 360 having the first height h1 at the shielding area S2 may be reduced. The data metal layer and the ohmic contact layer 216 provided at the partial exposure area S3, that is, at the channel portion of the thin film transistor may be removed by an etching process using the photo-resist pattern 360, thereby disconnecting the drain electrode 210 from the source electrode 208.

Figure 17D:
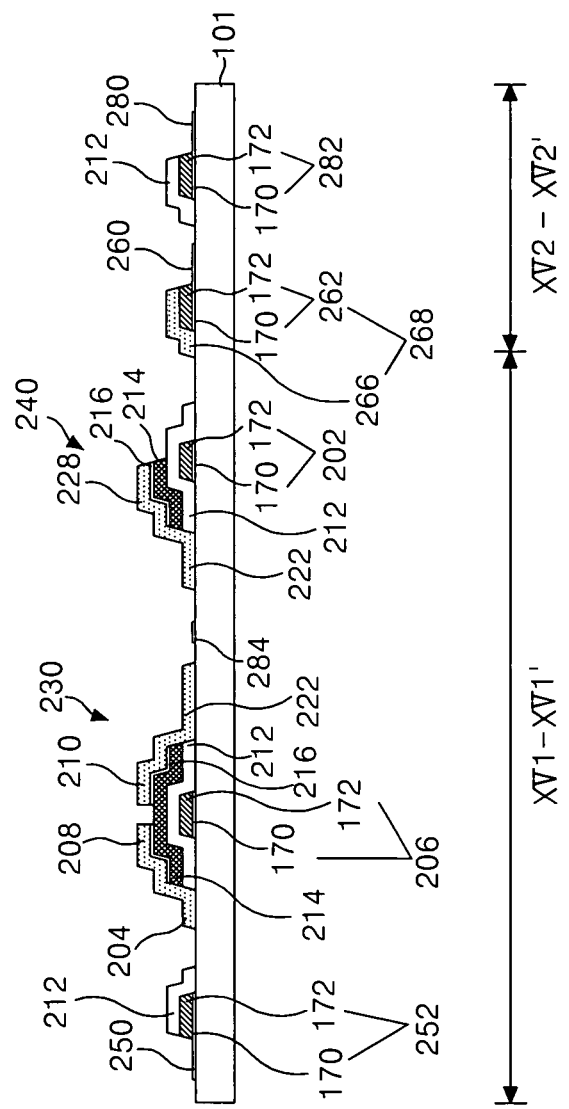

In FIG. 17D, the photo-resist pattern 360 remaining on the data pattern may be removed by a stripping process.

Figure 17E:
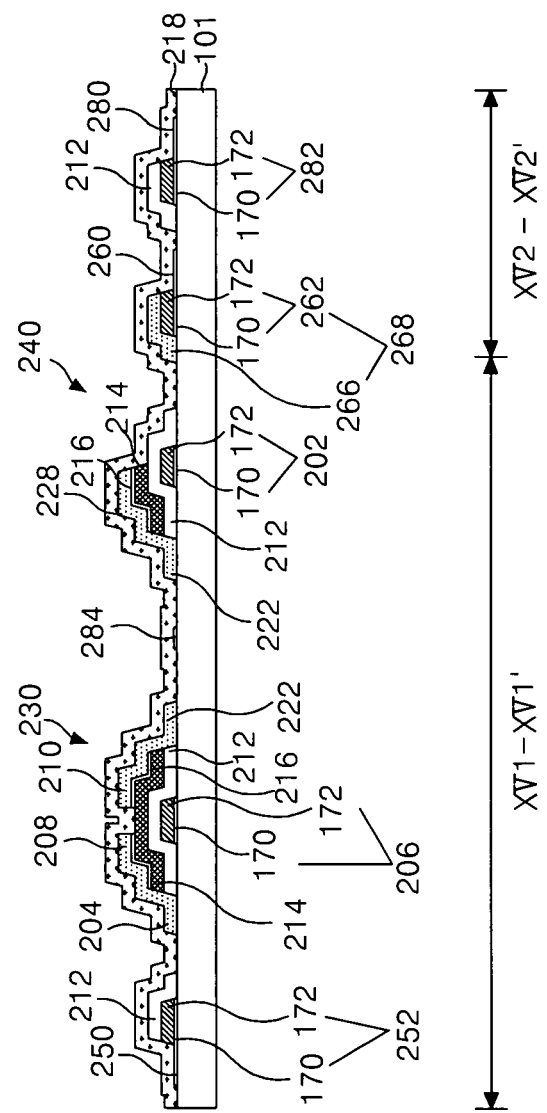

In FIG. 17E, a protective film 218 may be formed along an entire surface of the substrate 101 provided with the data pattern. The protective film 218 may be made from an inorganic insulating material identical to the gate insulating pattern 212, or an organic insulating material, such as an acrylic organic compound having a small dielectric constant, benzocyclobutene (BCB) or perfluorocyclobutane (PFCB).

Figure 18:
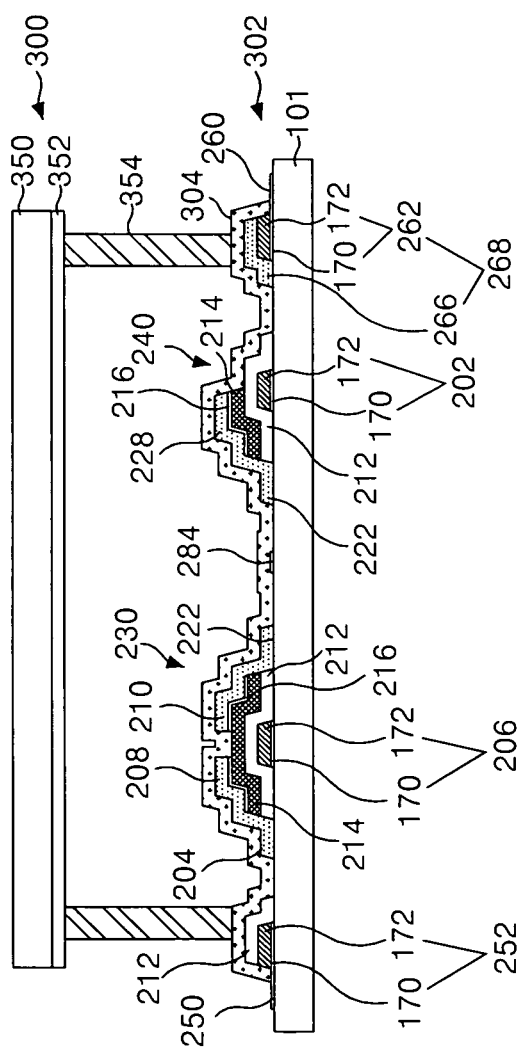
FIG. 18 is a cross sectional view of an exemplary LCD panel device including the exemplary lower array substrate of FIG. 15 according to the present invention.

FIG. 18 is a cross sectional view of an exemplary LCD panel device including the exemplary lower array substrate of FIG. 15 according to the present invention. In FIG. 18, an LCD panel includes device may include an upper array substrate 300 and a lower array substrate 302 that are joined to each other by a sealant 354. In the upper array substrate 300, an upper array 352 including black matrices, color filters, and common electrodes may be provided on an upper substrate 350. The lower array substrate 302 may be provided such that an area thereof overlapping with the upper array substrate 300 may be protected by a protective pattern 304 and the transparent conductive film 170 included in any one of the gate pad 250, the data pad 260, and the common pad at a pad area that does not overlap with the upper array substrate 300 may be exposed.

An exemplary method of fabricating an LCD panel device may include separate preparation of an upper array substrate 300 and a lower array substrate 302, and then the upper and lower array substrates 300 and 302 may be joined to each other by the sealant 354. Then, a protective film 218 of the lower array substrate 302 may be patterned by a pad opening process using the lower array substrate 300 as a mask to provide a protective pattern 304 at a display area and expose the transparent conductive film 170 included in any at least one of the gate pad 250, the data pad 260, and the common pad at the pad area.

Meanwhile, a pad opening process may sequentially scan each pad exposed by the upper array substrate 300 using a plasma generated by an atmosphere plasma generator, or may collectively scan each pad, thereby exposing the transparent conductive films 170 of the gate pad 250 and the data pad 260. Alternatively, a plurality of liquid crystal cells made by a joining of the upper array substrate 300 with the lower array substrate 302 may be introduced into a chamber. Then, the protective film 218 at the pad area may be exposed by the upper array substrate 300 with the aid of a normal-pressure plasma, thereby exposing the transparent conductive films 170 of the gate pad 250 and the data pad 260. Otherwise, the LCD panel device in which the upper array substrate 300 and the lower array substrate 302 are joined with each other may be immersed into an etching liquid, or the pad area including the gate pad 250 and the data pad 260 may only be immersed into the etching liquid, thereby exposing the transparent conductive films 170 of the gate pad 250 and the data pad 260.

Figure 19:
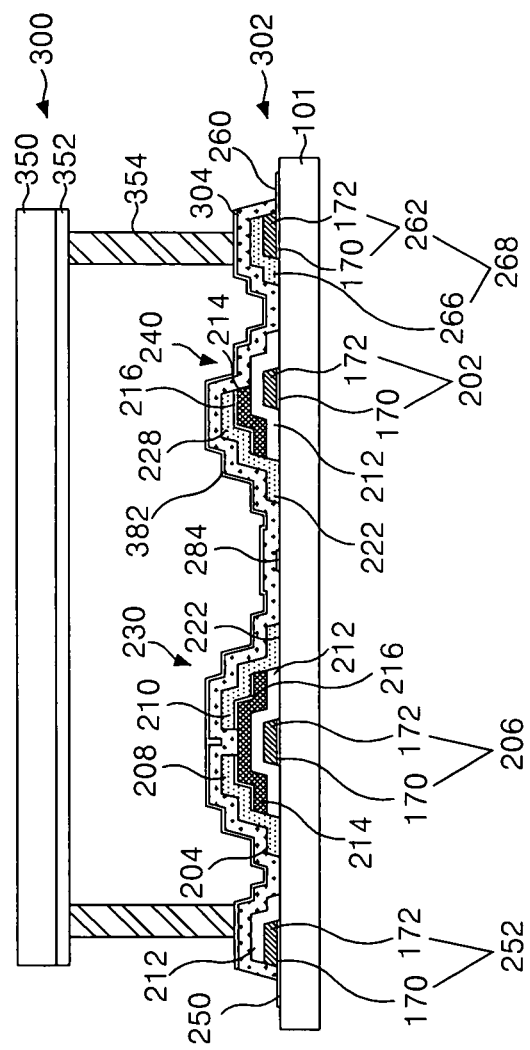
FIG. 19 is a cross sectional view of another exemplary LCD panel device including the exemplary lower array substrate of FIG. 15 according to the present invention.

FIG. 19 is a cross sectional view of another exemplary LCD panel device including the exemplary lower array substrate of FIG. 15 according to the present invention. In FIG. 19, an LCD panel device may include an upper array substrate 300 and a lower array substrate 302 that are joined to each other by a sealant 354. The lower array substrate 302 may be provided such that a display area defined by an alignment film 382 may be protected by a protective pattern 304 and the transparent conductive film 170 included in any at least one of the gate pad 250, the data pad 260, and the common pad at a pad area included in an area where it does not overlap with the alignment film 382 may be exposed. Accordingly, the protective pattern 304 may be formed by a pattern made by an etching process using the alignment film 382 as a mask. In the upper array substrate 300, an upper array 352 including black matrices, color filters, and common electrodes may be provided on an upper substrate 350.

According to the present invention, a pixel electrode and gate pattern may be formed by a first mask process, a semiconductor pattern may be formed by a second process; and a data pattern may be formed by a third mask process. Accordingly, a driving electrode including any one of the pixel electrode and the common electrode may expose the transparent conductive film included in them upon the second or third mask process. The lower array substrate may be formed by the three-round mask process in this manner, so that it becomes possible to simplify its structure and its manufacturing process, thereby reducing manufacturing costs and improving production yield. Furthermore, the transparent conductive film included in the pad may be exposed by a pad opening process after the joining of the substrates, or the printing of the alignment film, thereby preventing corrosion of the pad electrode.

It will be apparent to those skilled in the art that various modifications and variations can be made in the LCD panel device and method of fabricating an LCD panel device of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display panel device, the method comprising:
    providing a lower array substrate comprising:
        a gate line provided on a substrate, wherein the gate line is formed of a double-layer structure including a transparent conductive film and a gate metal film sequentially;
        a data line provided on a substrate intersecting the gate line to define a pixel area;
        a thin film transistor provided at the intersection between the gate line and the data line, the thin film transistor having a semiconductor pattern;
        a protective film for protecting the thin film transistor;
        a pixel electrode directly formed on the pixel area of the substrate, the pixel electrode being directly connected to a drain electrode of the thin film transistor, and being formed of the transparent conductive film;
        a gate pad connected to the gate line and formed from the transparent conductive film; and
        a data pad connected to the data line and formed from the transparent conductive film;
    providing a color filter array substrate opposed to the thin film transistor array substrate;
    joining the thin film transistor array substrate with the color filter array substrate to expose a pad area including the gate pad and the data pad; and
    exposing the transparent conductive film at the pad area using the color filter array substrate as a mask,
    wherein the pixel electrode, the gate pad and the data pad include the same transparent conductive film,
    wherein the semiconductor pattern forms a channel between a source electrode and the drain electrode and include an active layer partially overlapping with a gate electrode of the thin film transistor,
    wherein the semiconductor pattern includes an ohmic contact layer for making ohmic contact with the data line, the source electrode, and the drain electrode, wherein each of the gate pad and the data pad is formed of a single layer that is identical with the transparent conductive film of the pixel electrode, and wherein the gate pad and the data pad are directly contacted with the substrate.

2. The method according to claim 1, wherein the step of providing the lower array substrate includes:

forming gate patterns having the gate line, the gate electrode, the gate pad, and the data pad including the transparent conductive film and the pixel electrode on the substrate;

forming a semiconductor pattern and a gate insulating pattern on the substrate provided with the gate patterns and the pixel electrode and exposing the transparent conductive films included in the data pad, the gate pad, and the pixel electrode;

forming a data pattern including the data line, a source electrode, and a drain electrode on the substrate provided with the semiconductor pattern and the gate insulating pattern; and forming a protective film on the substrate provided with the data pattern.

3. The method according to claim 1, wherein the step of providing the lower array substrate includes:

forming gate patterns having the gate line, the gate electrode, the gate pad, the common line, the common electrode, the common pad, and the data pad including the transparent conductive film and the pixel electrode on the substrate;

forming a semiconductor pattern and a gate insulating pattern on the substrate provided with the gate patterns and the pixel electrode;

forming a data pattern including the data line, a source electrode, and a drain electrode on the substrate provided with the semiconductor pattern and the gate insulating pattern and exposing the transparent conductive films included in the data pad, the gate pad, the common pad, the common electrode, and the pixel electrode; and forming a protective film on the substrate provided with the data pattern.

4. The method according to claim 1, wherein the step of providing the color filter array substrate includes:

providing a common electrode for creating a vertical electric field with the pixel electrode.

5. The method according to claim 1, wherein the step of exposing the transparent conductive film includes:

dry etching the protective film by an atmosphere plasma using the color filter array substrate as a mask.

6. The method according to claim 1, wherein the step of exposing the transparent conductive film includes:

dry etching the protective film by a normal-pressure plasma using the color filter array substrate as a mask.

7. The method according to claim 1, wherein the step of exposing the transparent conductive film includes:

wet etching the protective film exposed by the color filter array substrate by liquid crystal cells made by a joining of the color filter array substrate with the thin film transistor array substrate.

* * * * *